US012046412B2

(12) United States Patent
Yoon et al.

(10) Patent No.: US 12,046,412 B2
(45) Date of Patent: Jul. 23, 2024

(54) TRANSFORMER

(71) Applicant: LG INNOTEK CO., LTD., Seoul (KR)

(72) Inventors: Soo Kwang Yoon, Seoul (KR); Yu Seon Kim, Seoul (KR); Seok Bae, Seoul (KR); Jung Ki Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 713 days.

(21) Appl. No.: 17/253,191

(22) PCT Filed: Jun. 14, 2019

(86) PCT No.: PCT/KR2019/007184
§ 371 (c)(1),
(2) Date: Dec. 17, 2020

(87) PCT Pub. No.: WO2019/245233
PCT Pub. Date: Dec. 26, 2019

(65) Prior Publication Data

US 2021/0280366 A1 Sep. 9, 2021

(30) Foreign Application Priority Data

Jun. 22, 2018 (KR) ........................ 10-2018-0072082
Sep. 18, 2018 (KR) ........................ 10-2018-0111707

(51) Int. Cl.
*H01F 27/32* (2006.01)
*H01F 5/02* (2006.01)
(Continued)

(52) U.S. Cl.
CPC ............. *H01F 27/325* (2013.01); *H01F 5/02* (2013.01); *H01F 27/2866* (2013.01); *H01F 27/29* (2013.01)

(58) Field of Classification Search
CPC ...... H01F 27/325; H01F 5/02; H01F 27/2866; H01F 27/29
(Continued)

(56) References Cited

U.S. PATENT DOCUMENTS 7,091,817 B2 * 8/2006 Peck .................. H01F 27/2847 336/200
7,218,199 B1 * 5/2007 Chang ................ H01F 27/2866 336/212
(Continued)

FOREIGN PATENT DOCUMENTS

CN 1036102 10/1989
CN 201853566 6/2011
(Continued)

OTHER PUBLICATIONS

Korean Office Action dated Mar. 14, 2023 issued in Application No. 10-2018-0072082.
(Continued)

*Primary Examiner* — Shawki S Ismail
*Assistant Examiner* — Joselito S. Baisa
(74) *Attorney, Agent, or Firm* — KED & Associates LLP

(57) ABSTRACT

The present invention pertains to a transformer, and more specifically, to a transformer which includes a primary coil unit comprising wound conductive lines, and a secondary coil unit in which conductive plates are stacked. The transformer according to an embodiment of the present invention may include: a bobbin; a core unit which is coupled to the bobbin along the outer side of the bobbin; and a plurality of conductive plates which are inserted into the bobbin and stacked in the thickness direction.

14 Claims, 25 Drawing Sheets

(51) Int. Cl.
*H01F 27/28* (2006.01)
*H01F 27/29* (2006.01)

(58) Field of Classification Search
USPC ........................................................... 336/198
See application file for complete search history.

(56) References Cited

U.S. PATENT DOCUMENTS

| | | | | |
|---|---|---|---|---|
| 7,899,043 | B2 * | 3/2011 | Hu | H04L 45/04 370/389 |
| 8,013,709 | B2 * | 9/2011 | Tsai | H01F 27/2847 336/119 |
| 8,203,415 | B2 * | 6/2012 | Wu | H01F 27/325 336/212 |
| 9,349,521 | B2 * | 5/2016 | Tsai | H01F 27/28 |
| 11,842,838 | B2 * | 12/2023 | Huang | H01F 27/24 |
| 2007/0057757 | A1 | 3/2007 | Chen et al. | |
| 2008/0284551 | A1 * | 11/2008 | Chen | H01F 27/2866 336/182 |
| 2010/0033282 | A1 * | 2/2010 | Hsu | H05K 1/141 336/65 |
| 2011/0115598 | A1 | 5/2011 | Wu et al. | |
| 2012/0062347 | A1 | 3/2012 | Ishikawa et al. | |
| 2013/0106557 | A1 * | 5/2013 | Kuang | H01F 27/40 336/220 |
| 2013/0188329 | A1 | 7/2013 | Chang et al. | |
| 2017/0367184 | A1 * | 12/2017 | Wang | H05K 3/306 |
| 2020/0105461 | A1 * | 4/2020 | Fu | H01F 27/325 |

FOREIGN PATENT DOCUMENTS

| | | |
|---|---|---|
| CN | 102376432 | 3/2012 |
| CN | 205069335 | 3/2016 |
| CN | 107221419 | 9/2017 |
| CN | 207353067 | 5/2018 |
| JP | 2014-060400 | 4/2014 |
| JP | 2017-224767 | 12/2017 |
| KR | 10-2010-0023608 | 3/2010 |
| KR | 10-1427633 | 8/2014 |
| KR | 10-2016-0126141 | 11/2016 |
| TW | 2011-18895 | 6/2011 |
| TW | 2014-13759 | 4/2014 |

OTHER PUBLICATIONS

Chinese Office Action dated Jun. 10, 2022 issued in Application No. 201980041770.1.

International Search Report dated Sep. 27, 2019 issued in Application No. PCT/KR2019/007184.

* cited by examiner

TRANSFORMER

CROSS-REFERENCE TO RELATED PATENT APPLICATIONS

This application is a U.S. National Stage Application under 35 U.S.C. § 371 of PCT Application No. PCT/KR2019/007184, filed Jun. 14, 2019, which claims priority to Korean Patent Application Nos. 10-2018-0072082, filed Jun. 22, 2018 and 10-2018-0111707, filed Sep. 18, 2018, whose entire disclosures are hereby incorporated by reference.

TECHNICAL FIELD

The present disclosure relates to a transformer including a primary coil unit composed of wound conductive lines and a secondary coil unit in which conductive plates are stacked.

BACKGROUND ART

Various coil components, such as a transformer and a line filter, are mounted in a power supply unit of an electronic device.

A transformer may be included in electronic devices for various purposes. For example, a transformer may be used to perform an energy transfer function of transferring energy from one circuit to another circuit. In addition, a transformer may be used to perform a voltage-boosting or voltage reduction function of changing the magnitude of voltage. In addition, a transformer, which has characteristics in which only inductive coupling is exhibited between primary and secondary coils and thus no DC path is directly formed, may be used to block direct current and apply alternating current or to insulate between two circuits.

In general, a transformer uses a bobbin in order to maintain an insulation distance between a primary coil, a secondary coil, and a core, to protect respective components, and to fix the positions of the components. In order to perform these functions, a polymer-based material, such as PET, PBT or LCP, which has excellent formability, processability, insulativity, and impact resistance, is used for a bobbin. However, due to the characteristics thereof, the polymer has notably poor heat transfer properties compared to metal, and is thus disadvantageous in terms of dissipation of heat from a core or a coil, in which high-temperature heat is generated, resulting in deterioration in the efficiency of a transformer. Specifically, current, other than the current that is consumed when a transformer boosts or reduces voltage, is lost and is converted into heat, and the heat is released from a core and primary and secondary coils. For example, in the case of a 3 kW transformer, when 1% loss occurs, 30 W of heat is generated. In addition to efficiency, heat dissipation performance is also an important performance index of a transformer.

However, in general, because a transformer is configured such that a lower portion of a core is in contact with a substrate and an upper portion of the core is fixed to a metallic bracket, the heat generated from primary and secondary coils is discharged to the substrate or the bracket via the core. Therefore, it is preferable for a bobbin to have a structure that enables the heat generated from the primary and secondary coils to be easily transferred to the core. Generally, the bobbin has a shape that surrounds most of the secondary coil in order to secure an insulation distance. Therefore, there is the need for a bobbin capable of improving the heat dissipation performance of a transformer.

Meanwhile, in recent years, according to the trend of miniaturization and integration of various electronic devices, there is a need to reduce the size of a transformer, which is a power supply device. Also, research is underway toward the implementation of a secondary coil using a metal plate in order to satisfy high power performance while reducing the size thereof. However, in order to realize a plurality of turns in a secondary coil using a metal plate, methods of electrically connecting and fixing a plurality of metal plates stacked in a thickness direction are required. As one of these fixing methods, a soldering method may be considered, but there is a problem in that the area of a coil is so large that it is difficult to apply solder thereto, and heat is dispersed due to the space between the metal plates, whereby workability is deteriorated, and consequently, productivity is reduced. In addition, metal plates constituting a secondary coil have connection portions extending from portions functioning as a coil for connection with external parts, but there is a problem in that a current concentration phenomenon occurs at boundaries with the connection portions.

DISCLOSURE

Technical Problem

The present disclosure has been made in order to solve the above problems with the conventional art, and provides a transformer including a bobbin capable of efficiently dissipating heat.

In addition, the present disclosure provides a transformer capable of securing fixability of a secondary coil unit and a core.

In addition, the present disclosure provides an efficient connection structure of a secondary coil unit in which a plurality of metal plates is stacked.

In addition, the present disclosure provides a transformer capable of alleviating a current concentration phenomenon of a secondary coil unit.

The objects to be accomplished by the disclosure are not limited to the above-mentioned objects, and other objects not mentioned herein will be clearly understood by those skilled in the art from the following description.

Technical Solution

In order to accomplish the above objects, a transformer according to an embodiment of the present disclosure structurally compensates for poor heat dissipation caused by use of a bobbin made of a polymer material having excellent insulativity.

To this end, a transformer according to an embodiment may include a bobbin, a core part disposed outside the bobbin to expose a portion of the bobbin, and a plurality of conductive plates inserted into the bobbin, the plurality of conductive plates being stacked in a thickness direction. The bobbin may have therein openings to respectively expose, among the plurality of conductive plates, a portion of the upper surface of the conductive plate located at the uppermost position in the thickness direction and a portion of the lower surface of the conductive plate located at the lowermost position in the thickness direction.

In addition, a transformer according to an embodiment may include a bobbin, a core part disposed outside the bobbin to expose a portion of the bobbin, and a plurality of conductive plates inserted into the bobbin, the plurality of conductive plates constituting an upper coil part, a middle coil part, and a lower coil part. The bobbin may include a lower receiving part receiving the lower coil part, a middle receiving part disposed on the lower receiving part to receive the middle coil part, and an upper receiving part disposed on the middle receiving part to receive the upper coil part. The upper receiving part may include a first protruding portion covering at least a portion of the upper surface of the uppermost conductive plate of the upper coil part, and the lower receiving part may include a second protruding portion covering at least a portion of the lower surface of the lowermost conductive plate of the lower coil part.

For example, the bobbin may further include an upper connection part connecting the upper receiving part and the middle receiving part and a lower connection part connecting the middle receiving part and the lower receiving part.

For example, the upper receiving part may include a bottom portion that is in contact with the upper connection part, a middle portion forming a sidewall of the upper receiving part and extending upwards from at least a region of the edge of the upper surface of the bottom portion, and a top portion disposed along the upper surface of the middle portion.

For example, the first protruding portion may protrude from the top portion.

For example, the outer side surfaces of the bottom portion, the middle portion and the top portion may be aligned in the thickness direction.

For example, the upper surface of the top portion may protrude further inwards than the lower surface thereof that is in contact with the middle portion when viewed in plan.

For example, the inner side surface of the top portion may be formed at an incline.

For example, the inner side surface of the top portion and the inner side surface of the middle portion may form an obtuse angle therebetween.

For example, the edge of at least a portion of the upper surface of the uppermost conductive plate of the upper coil part may be formed at an incline.

In addition, a transformer according to still another embodiment may include a bobbin, a core part coupled to the bobbin along the outer side of the bobbin, and a plurality of conductive plates inserted into the bobbin, the plurality of conductive plates being stacked in a thickness direction, and each of the plurality of conductive plates including a coil portion corresponding to a winding of a secondary coil, and a first connection portion and a second connection portion respectively extending from both ends of the coil portion in one direction. The one direction may have a predetermined inclination with respect to a long-axis direction of the core part when viewed in plan.

For example, each of the plurality of conductive plates may include a first boundary portion between the outer side of one end of the coil portion and the first connection portion, a second boundary portion between the inner side of the one end and the first connection portion, a third boundary portion between the inner side of the other end of the coil portion and the second connection portion, and a fourth boundary portion between the outer side of the other end and the second connection portion.

For example, the curvature of any one boundary portion among the first boundary portion to the fourth boundary portion may be greater than the curvatures of three remaining boundary portions.

For example, the first connection portion may be connected to a ground terminal, the second connection portion may be connected to a signal terminal, and the any one boundary portion having a curvature greater than the curvatures of the three remaining boundary portions may be the fourth boundary portion.

For example, the plurality of conductive plates may include a plurality of first type of conductive plates and a plurality of second type of conductive plates having a planar shape that is bilaterally symmetrical with the planar shape of the first type of conductive plates, and the plurality of first type of conductive plates and the plurality of second type of conductive plates may be alternately disposed.

For example, the predetermined inclination may be less than 87 degrees.

In addition, a transformer according to still another embodiment may include a bobbin, a core part coupled to the bobbin along the outer side of the bobbin, and a plurality of conductive plates inserted into the bobbin, the plurality of conductive plates being stacked in a thickness direction, and each of the plurality of conductive plates including a coil portion corresponding to a winding of a secondary coil, the coil portion having an open annular planar shape, a first connection portion extending from one end of the coil portion in a first direction, and a second connection portion extending from the other end of the coil portion in a second direction different from the first direction. The first direction and the second direction may form a predetermined angle therebetween when viewed in plan.

For example, the predetermined angle may be between 3 degrees and 90 degrees.

For example, the first direction may correspond to a direction in which the plurality of conductive plates is inserted into the bobbin.

For example, the plurality of conductive plates may include a plurality of first type of conductive plates and a plurality of second type of conductive plates having a planar shape that is bilaterally symmetrical with the planar shape of the first type of conductive plates, and the plurality of first type of conductive plates and the plurality of second type of conductive plates may be alternately disposed.

Advantageous Effects

The effects of a transformer according to the present disclosure will be described below.

First, an insulation distance between a secondary coil and a primary coil may be secured, and at the same time, heat dissipation performance of the secondary coil may be improved.

Second, the present disclosure is capable of securing fixability of the secondary coil unit while maintaining heat dissipation performance.

Third, a plurality of metal plates constituting the secondary coil may be efficiently engaged.

Fourth, the present disclosure is capable of alleviating a current concentration phenomenon of the secondary coil unit.

The effects achievable through the disclosure are not limited to the above-mentioned effects, and other effects not mentioned herein will be clearly understood by those skilled in the art from the following description.

DESCRIPTION OF DRAWINGS

The accompanying drawings are included to provide a further understanding of the disclosure and illustrate embodiments of the disclosure together with the detailed description. However, the technical features of the disclosure are not limited to specific drawings, and the features shown in the drawings may be combined to construct a new embodiment.

BEST MODE

Hereinafter, devices and methods to which embodiments of the present disclosure are applied will be described in detail with reference to the accompanying drawings. The suffixes "module" and "unit" used herein to describe configuration components are assigned or used in consideration only of convenience in creating this specification, and the two suffixes themselves do not have any distinguished meanings or roles from each other.

In the following description of the embodiments, it will be understood that, when each element is referred to as being formed "on" or "under" and "ahead of" or "behind" another element, it can be directly "on" or "under" and "ahead of" or "behind" the other element, or can be indirectly formed with one or more intervening elements therebetween.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

Additionally, the term "comprises", "includes", or "has" described herein should be interpreted not to exclude other elements but to further include such other elements since the corresponding elements may be inherent unless mentioned otherwise. Unless otherwise defined, all terms used herein, which include technical or scientific terms, have the same meanings as those generally appreciated by those skilled in the art. Terms such as those defined in common dictionaries should be interpreted as having the same meanings as terms in the context of the pertinent technology, and should not be interpreted as having ideal or excessively formal meanings unless clearly defined in the specification.

Hereinafter, a transformer according to the embodiment will be described in more detail with reference to the accompanying drawings.

Figure 1:
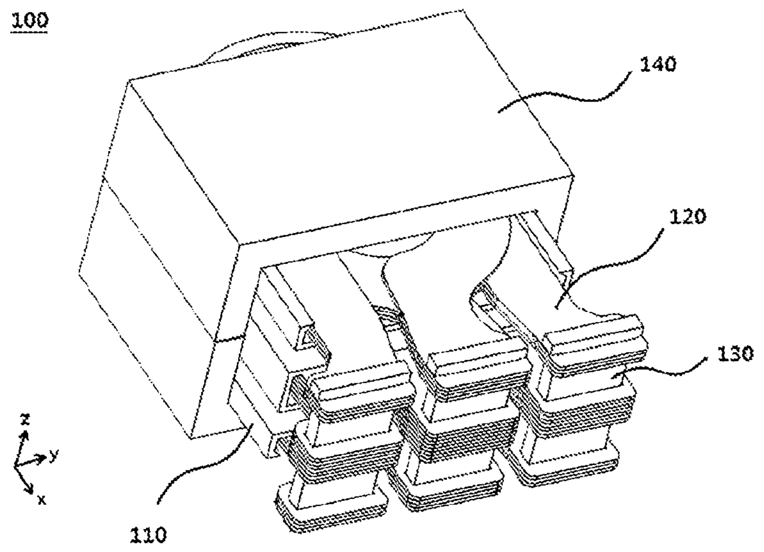
FIG. 1 is a perspective view showing an example of a transformer according to an embodiment of the present disclosure.
Figure 2:
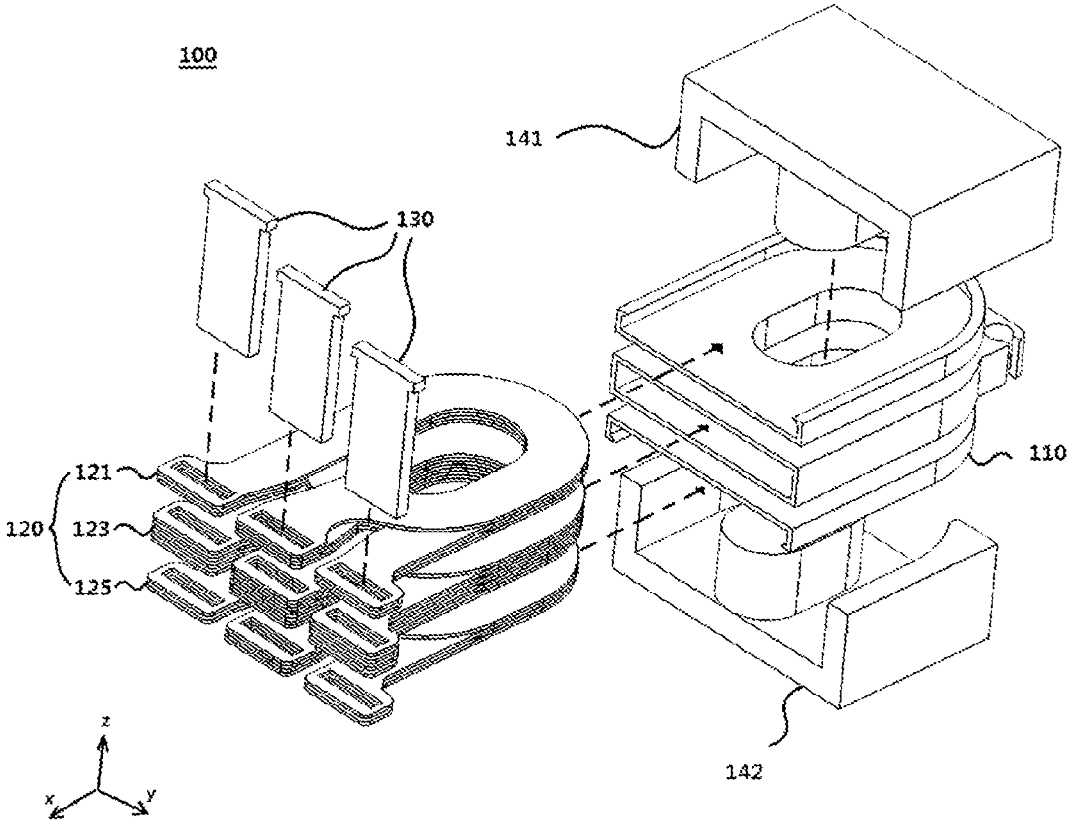
FIG. 2 is an exploded perspective view showing an example of a transformer according to an embodiment of the present disclosure.

FIG. 1 is a perspective view showing an example of a transformer 100 according to an embodiment of the present disclosure, and FIG. 2 is an exploded perspective view showing an example of a transformer according to an embodiment of the present disclosure.

Referring to FIGS. 1 and 2, a transformer 100 according to an embodiment of the present disclosure may include a bobbin 110, a plurality of conductive plates 120 inserted into the bobbin 110, a plurality of engaging parts 130 electrically connecting the plurality of conductive plates 120 so as to constitute a secondary coil unit together with the plurality of conductive plates 120 in an integral form, and a core part 140 coupled to the outer side of the bobbin 110 so as to surround at least a portion of the bobbin 110.

Here, the transformer 100 according to the embodiment may further include a conductive wire wound on the bobbin 110 to constitute a primary coil unit, but an illustration thereof is omitted in the drawings of this specification. The primary coil unit (not shown) may take a multiple-winding form, in which a rigid conductive metal, e.g. a copper conductive wire, is wound several times, or a plate form.

The secondary coil unit 120 and 130 may transform and output a power signal received from the primary coil unit (not shown). In FIG. 1, the secondary coil unit 120 and 130 may be configured such that a total of sixteen conductive plates is stacked in a thickness direction (e.g. a z-axis direction). Each conductive plate may correspond to one turn in the secondary coil unit. That is, when sixteen conductive plates are used, the number of turns in the secondary coil unit may be sixteen, but this is merely given by way of example. A greater or smaller number of conductive plates may be used. In this case, the number of turns in the secondary coil unit may be proportional to the number of conductive plates.

For example, each of the plurality of conductive plates 120 may be inserted into the bobbin 110 in a direction parallel to the x-axis.

The plurality of conductive plates 120 may be electrically insulated from each other by insulation materials, except for electrical connection via the engaging parts 130. For example, an insulation film may be disposed between adjacent conductive plates among the plurality of conductive plates in order to electrically insulate the conductive plates from each other. The insulation film may include components such as ketone and polyimide, without being necessarily limited thereto. The conductive plates 120 may include an upper coil part 121, a middle coil part 123, and a lower coil part 125. The coil parts 121, 123 and 125 may be spaced apart from each other in the thickness direction.

In addition, the plurality of conductive plates 120 may include a conductive metal, e.g. copper, without being necessarily limited thereto. For example, the plurality of conductive plates may include aluminum. When aluminum is used instead of copper, the thickness of each conductive plate may be approximately 60% greater than when copper is used, but this thickness ratio is not limiting.

The bobbin 110 may have a shape suitable for insulating the conductive wires (not shown) constituting the primary coil unit, the plurality of conductive plates 120 constituting the secondary coil unit, and the core part 140 from each other while accommodating or fixing at least a portion of each of the components 120 and 140.

The bobbin 110 may include an insulation material, e.g. a resin material, and may be produced through a molding method. The bobbin 110 according to the embodiments of the present disclosure may have openings for respectively exposing a portion of the upper surface of the conductive plate located at the uppermost position in the thickness direction and a portion of the lower surface of the conductive plate located at the lowermost position in the thickness direction, among the plurality of conductive plates 120. The more concrete shape of the bobbin 110 will be described later with reference to FIGS. 3A to 3I.

The engaging parts 130 may have a metal bar shape, may penetrate one end portion of each of the conductive plates 120 in the thickness direction (e.g. the Z-axis direction), and may be fixed to each of the conductive plates 120 through a soldering method. Of course, in some embodiments, the metal bar may be replaced with other fastening members such as bolts, nuts, and washers.

The core part 140, which has the characteristics of a magnetic circuit, may serve as a path for magnetic flux. The core part may include an upper core 141 coupled from the upper side and a lower core 142 coupled from the lower side. The two cores 141 and 142 may have shapes that are vertically symmetrical with each other, or may have shapes that are vertically asymmetrical with each other. The core part 140 may include a magnetic material, e.g. iron or ferrite, without being necessarily limited thereto. The concrete shape of the core part 140 will be described later with reference to FIG. 4.

FIGS. 3A to 3J show the shapes of bobbins according to embodiments of the present disclosure.

Figure 3A:
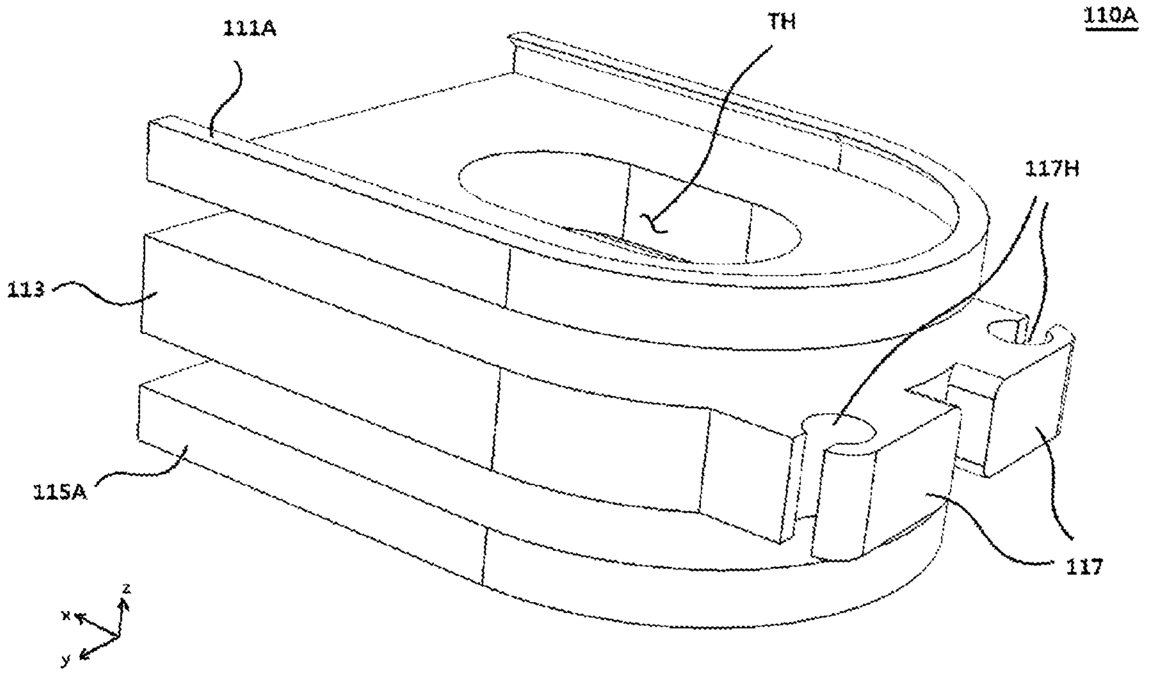
FIGS. 3A to 3J show the shapes of bobbins according to embodiments of the present disclosure.
Figure 3B:
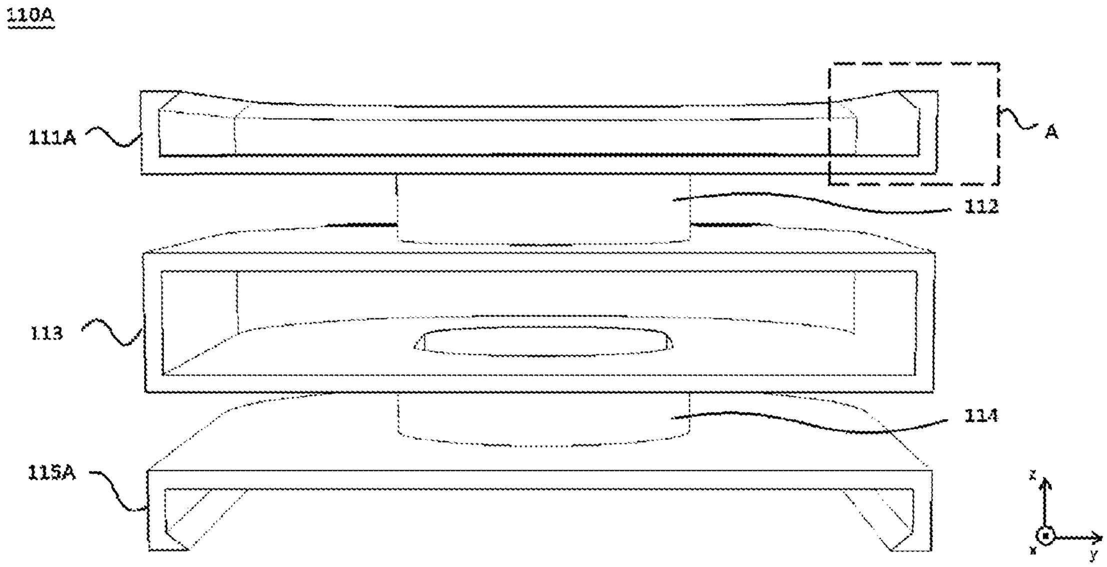

First, referring to FIGS. 3A and 3B, a bobbin 110A according to an embodiment may include an upper receiving part 111A, a middle receiving part 113, a lower receiving part 115A, an upper connection part 112 connecting the upper receiving part 111A and the middle receiving part 113, a lower connection part 114 connecting the middle receiving part 113 and the lower receiving part 115A, and a winding-fixing part 117.

Except for the winding-fixing part 117, each of the receiving parts 111A, 113 and 115A may have a "U"-shaped planar shape or a track-shaped planar shape in which one semicircular portion is cut off. Each of the receiving parts 111A, 113 and 115A and the two connection parts 112 and 114 may be aligned in the vertical direction about a through-hole TH when viewed in plan. Further, the inner surface of each of the connection parts 112 and 114 may define the sidewall of the through-hole TH. The through-hole TH may have a track-shaped planar shape, but this is merely given by way of example, and there is no problem as long as the through-hole TH has a shape corresponding to the planar shape of a central leg of the core part 140 to be described later.

Each of the receiving parts 111A, 113 and 115A has a receiving hole, for receiving the conductive plate 120, and an opening, through which the conductive plate 120 is inserted and which is formed in the other side thereof that is opposite one side thereof, which has a semicircular shape in the X-Y plane. Here, the upper receiving part 111A and the lower receiving part 115A are formed to be vertically symmetrical with each other in the thickness direction (e.g. the Z-axis direction) such that the upper receiving part 111A is open upwards and the lower receiving part 111C is open downwards. Accordingly, at least a portion of the conductive plate located at the uppermost position in the upper coil part 121 received in the upper receiving part 111A is exposed in the upward direction, and at least a portion of the conductive plate located at the lowermost position in the lower coil part 125 received in the lower receiving part 115A is exposed in the downward direction. Accordingly, each of the upper coil part 121 and the lower coil part 125 has an increased heat dissipation area in at least one surface thereof, with the result that, depending on the position of the exposed surface, heat is rapidly transferred to the ambient air or to the core part 140 when the core part 140 is coupled thereto, thereby exhibiting advantageous heat dissipation effects.

Unlike the upper receiving part 111A and the lower receiving part 115A, the middle receiving part 113 may have an opening formed in the X-axis direction, but may not have an opening in the upward-downward direction, except for the through-hole TH. The purpose of this is to secure an insulation distance between the middle coil part 123 to be received in the middle receiving part 113 and the primary coil unit to be wound around the upper connection part 112 and the lower connection part 114.

The conductive wire (not shown) constituting the primary coil unit may be wound around the outer surface of the upper connection part 112 in the space between the upper receiving part 111A and the middle receiving part 130 and the outer surface of the lower connection part 114 in the space between the middle receiving part 113 and the lower receiving part 115A. The winding-fixing part 117 may include two holes 117H extending in the thickness direction, and one end and the other end of the conductive wire (not shown) constituting the primary coil unit may be fixedly fitted into the respective holes 117H.

Next, portion 'A' in FIG. 3B will be described in detail with reference to FIG. 3C.

Figure 3C:
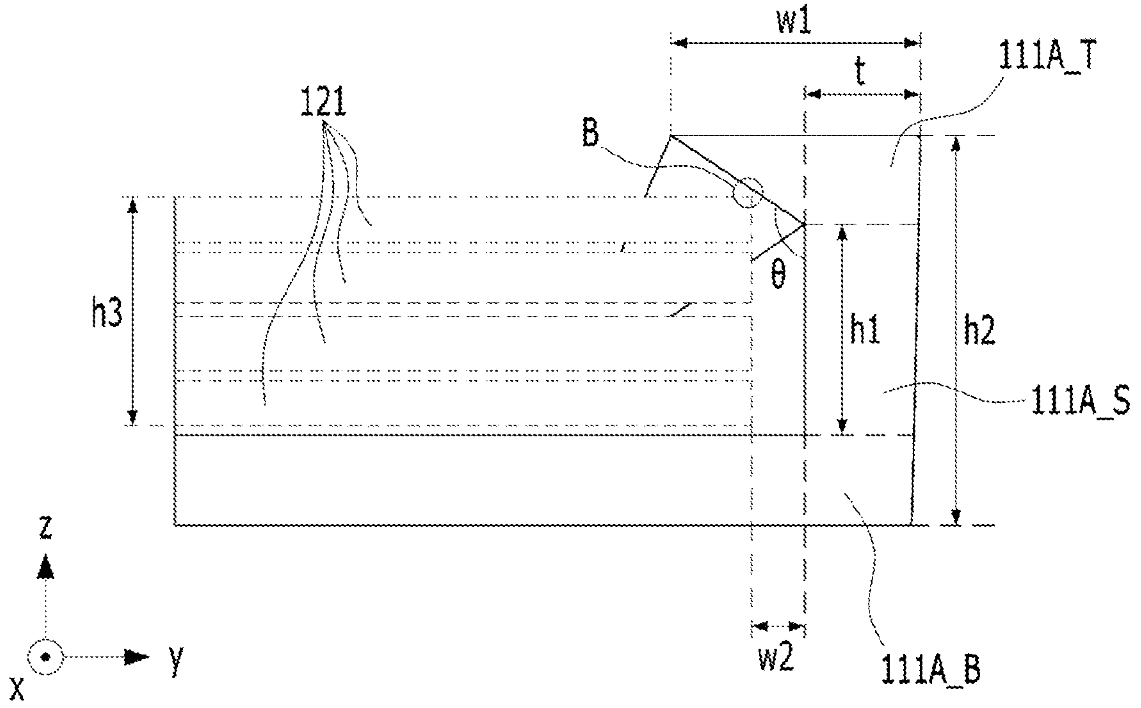

Referring to FIG. 3C, the upper receiving part 111A may include a bottom portion 111A_B, a middle portion 111A_S, and a top portion 111A_T. The outer surfaces of the bottom portion 111A_B, the middle portion 111A_S, and the top portion 111A_T may be aligned with each other in the thickness direction.

The middle portion 111A_S has a predetermined thickness t and a predetermined height h1, and forms the sidewall of the upper receiving part 111A. The middle portion 111A_S extends upwards from the upper surface of the bottom portion 111A_B along the edge of at least a region thereof (e.g. a region other than the opening formed in the X-axis direction) so as to have a "U"-shaped planar shape. The lower surface of the bottom portion 111A_B is connected to the upper connection part 112.

The lower surface of the top portion 111A_T may be in contact with the upper surface of the middle portion 111A_S, and may have the same planar shape as the upper surface of the middle portion 111A_S. In addition, the top portion 111A_T may have a trapezoidal cross-sectional shape, and thus the upper surface of the top portion 111A_T may protrude further inwards (i.e. toward the through-hole TH) than the lower surface thereof that is in contact with the middle portion 111A_S. Therefore, the inner side surface between the upper surface and the lower surface of the top portion 111A_T may be formed at an incline. In this case, it is preferable that the angle θ formed between the inner side surface of the middle portion 111A_S and the inner side surface of the top portion 111A_T be an obtuse angle. That is, the top portion 111A_T may have a protruding portion formed in an area that does not overlap the middle portion 111A_S in the thickness direction (e.g. the z-axis direction). In this case, the cross-sectional shape of the protruding portion may be a right triangle, and the angle θ formed between the inner side surface of the middle portion 111A_S and the inner side surface of the top portion 111A_T may correspond to one external angle of the right triangle, which is formed by the cross-sectional shape of the protruding portion. In addition, the region of the top portion 111A_T, other than the protruding portion, may have a rectangular cross-sectional shape. The upper surface of the bottom portion 111A_B, the inner side surface of the middle portion 111A_S, and the inclined inner side surface of the top portion 111A_T may define a receiving hole in the upper receiving part 111A, in which the upper coil part 121 is received.

In conclusion, the opening that upwardly exposes at least a portion of the upper surface of the conductive plate disposed at the uppermost position in the upper coil part 121 may be defined by the shape of the upper surface of the top portion 111A_T.

Meanwhile, the height h1 of the middle portion 111A_S may be smaller than the height of the upper coil part 121 received in the receiving hole in the upper receiving part 111A. In this case, due to the inclined inner side surface of the top portion 111A_T, when the upper coil part 121 is received in the receiving hole in the upper receiving part 111A, the edge of the upper surface of the uppermost conductive plate of the upper coil part 121 comes into contact with a portion B of the inner side surface of the top portion 111A_T.

Figure 3D:
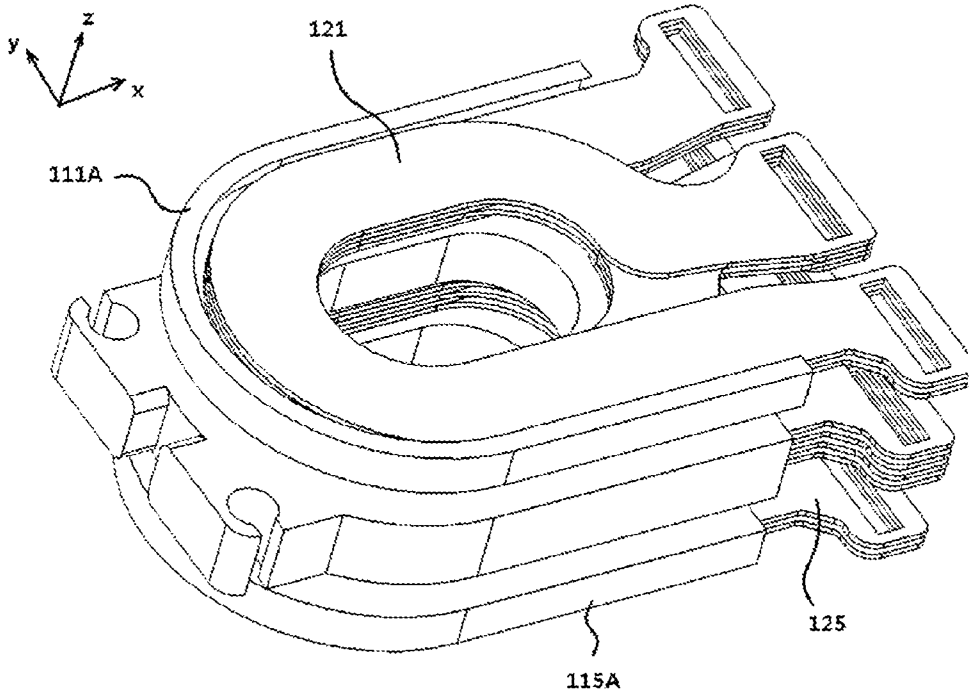

Due to this structure, even if a tolerance occurs in a manner such that the gap in the thickness direction between the conductive plates increases, the conductive plates are pressed by the inclined inner side surface of the top portion 111A_T, making it possible to accommodate the tolerance and to facilitate insertion of the coil part into the receiving hole in the manufacturing process. In addition, since the edge of the upper surface of the uppermost conductive plate of the upper coil part 121 is in point or line contact with the inner side surface of the top portion 111A_T, as shown in FIG. 3D, the entirety of the upper surface of the uppermost conductive plate may be substantially directly exposed to the air, and accordingly, the heat dissipation area may be maximized.

Further, even if the conductive wire (not shown) constituting the primary coil unit is also located on a region of the lower surface of the bottom portion 111A_B that overlaps the middle portion 111A_S in the thickness direction, the shortest insulation distance between the conductive wire and the upper coil part 121 increases from "h2+w1" by the distance between the inner edge of the upper surface of the top portion 111A_T and the point B. Accordingly, this configuration also exhibits effects of securing an additional insulation distance.

Meanwhile, the gap w2 between the upper coil part 121 and the inner side surface of the middle portion 111A_S may depend on the processing tolerances of the bobbin 110A and each of the conductive plates constituting the upper coil part 121. For example, although there is a difference depending on the kind of material, assuming that the tolerance of the bobbin 110A is ±0.2 mm and the tolerance of the conductive plate is ±0.1 mm, the gap w2 between the upper coil part 121 and the inner side surface of the middle portion 111A_S may be up to 0.3 mm. However, the upper coil part 121 needs to be fixed in the state of being in contact with the point B of the bobbin 110A. To this end, the width w1 of the upper surface of the top portion 111A_T needs to be greater than at least 'w2+t', so it is preferable to satisfy the condition 'w1>w2+t'.

Further, the height h2 of the upper receiving part 111A is the sum of the heights of the bottom portion 111A_B, the middle portion 111A_S, and the top portion 111A_T. Therefore, assuming that the height h2 of the upper receiving part 111A is fixed, when the gap w2 between the upper coil part 121 and the inner side surface of the middle portion 111A_S decreases, the value of θ approaches 90 degrees. However, since the angle θ is one external angle of the right triangle corresponding to the region of the top portion 111A_T that protrudes toward the through-hole TH, the value of θ exceeds 90 degrees at all times. Further, even if the height h1 of the middle portion 111A_S is infinitely small, the value of θ is less than 180 at all times.

Consequently, the value of θ may have a range of '90<θ<180'.

Further, the height h3 of the upper coil part 121 is greater than the height h1 of the middle portion 111A_S at all times, and as the height h1 of the middle portion 111A_S increases, the width w1 of the upper surface of the top portion 111A_T also needs to increase in order to remain in contact with the point B. However, the height h1 of the middle portion 111A_S is less than the height h3 of the upper coil part 121 at all times, and the height h3 of the upper coil part 121 depends on the thickness of the individual conductive plate. Therefore, assuming that the height h3 of the upper coil part 121 is 4 mm, the height h1 of the middle portion 111A_S needs to be less than 4 mm. In the state in which the gap w2 between the upper coil part 121 and the inner side surface of the middle portion 111A_S is maintained at 0.3 mm, as the value of θ approaches 90, the width w1 of the upper surface of the top portion 111A_T continuously increases, and at some point, the top portion 111A_T comes into contact with the top portion (not shown) that is located opposite the top portion 111A_T in the y-axis direction. This means that the opening in the upper receiving part 111A of the bobbin 110A, which is open in the upward direction, is not present, so it is difficult to expect heat dissipation effect.

Therefore, in order to achieve the intended heat dissipation function and the function of fixing the upper coil part 121 through contact with the point B, it is preferable for the width w1 of the upper surface of the top portion 111A_T to have a size for preventing the upper coil part from being separated upwards through the opening while minimally shielding the upper surface of the uppermost conductive plate of the upper coil part 121. Specifically, when the upper coil part 121 is assembled with the upper receiving part 111A, a gap w2 attributable to the above-mentioned tolerances is formed at each of both sides, and thus the length (i.e. w1-t) of the region of the top portion 111A_T that protrudes toward the through-hole TH may be twice the gap w2 between the upper coil part 121 and the inner side surface of the middle portion 111A_S in order to prevent separation of the upper coil part 121. For example, assuming that the thickness t of the middle portion 111A_S is 0.8 mm and the gap w2 between the upper coil part 121 and the inner side surface of the middle portion 111A_S is 0.3 mm, the width w1 of the upper surface of the top portion 111A_T may be 1.4 mm, which is 't+2*w2'. Of course, the thickness and the gap mentioned above are merely given by way of example, and it will be apparent to those skilled in the art that various changes in the thickness and the gap may be made depending on the designed size of the transformer 100.

Although the upper receiving part 111A has been described with reference to FIGS. 3C and 3D, the description of the upper receiving part 111A may identically apply to the lower receiving part 115A, except that the upper receiving part 111A and the lower receiving part 115A are vertically symmetrical with each other.

Next, according to another aspect of the present embodiment, the shape of the top portion 111A_T in the bobbin 110A shown in FIG. 3C may be replaced with a different shape. This will be described with reference to FIGS. 3E to 3H.

Figure 3E:
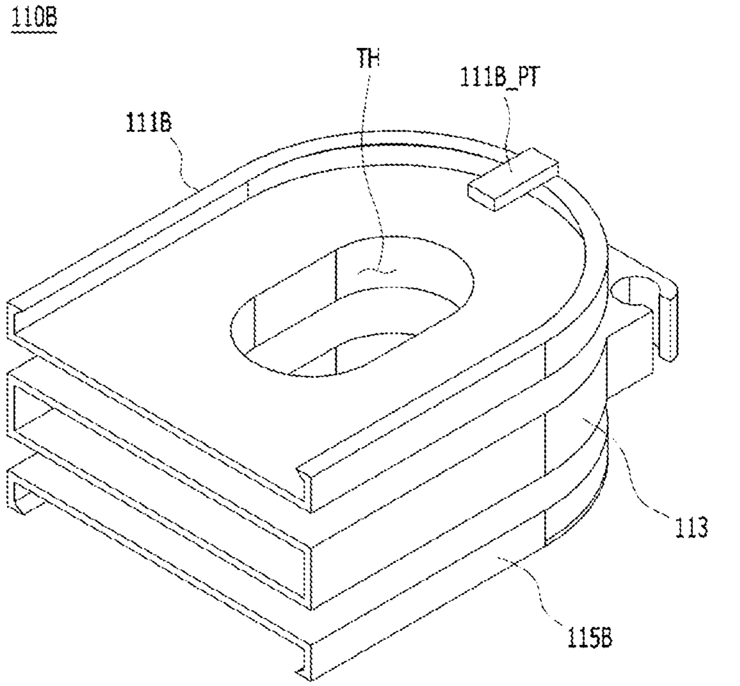

First, as shown in FIG. 3E, a bobbin 110B according to another aspect of the present embodiment may include, rather than the top portion 111A_T described above with reference to FIG. 3C, a fixing portion 111B_PT, which protrudes from a region of the upper surface of the sidewall of an upper receiving part 111B toward the through-hole TH when viewed in plan. For example, the fixing portion 111B_PT may have a rectangular column shape, and may extend toward the through-hole TH from the center of a portion having a semicircular planar shape, among the upper surface of the sidewall of the upper receiving part 111B. Due to the arrangement of the fixing portion 111B_PT, it is possible not only to prevent separation of the upper coil part 121 when the upper coil part 121 is received, but also to secure the heat dissipation area of the conductive plate located at the uppermost position in the upper coil part 121.

Figure 3F:
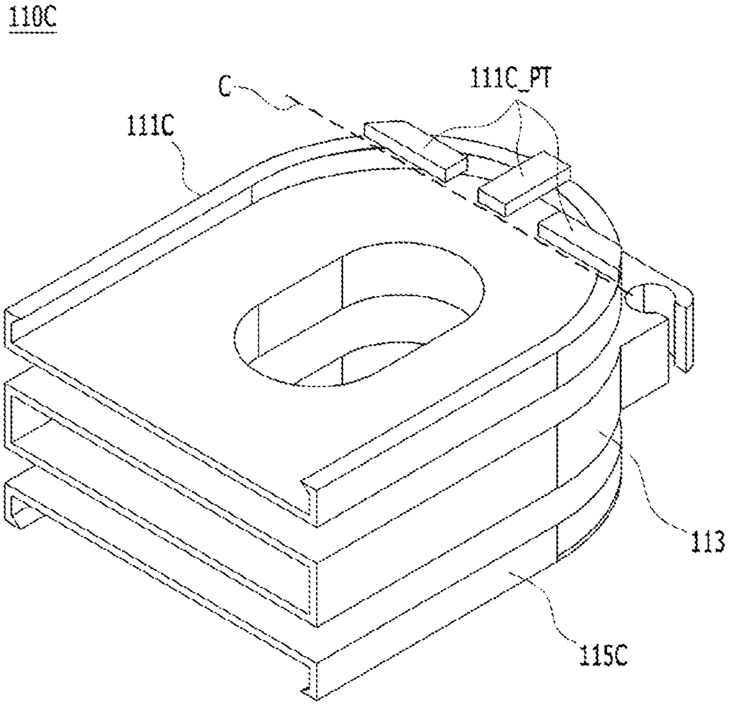

Further, as shown in FIG. 3F, a bobbin 110C according to still another aspect of the present embodiment may include a plurality of fixing portions 111C_PT.

In this case, in each of the fixing portions 111B_PT and 111C_PT shown in FIGS. 3E and 3F, it is preferable for one side surface oriented toward the through-hole TH to extend (for example, parallel to the axis C in FIG. 3F) so as to contact one side surface of the core part 140, which faces the one side surface of each of the fixing portions when the core part 140 is coupled to the bobbin 110B or 110C. Due thereto, each of the fixing portions 111B_PT and 111C_PT may secure fixability of the core part 140 together with the coil part.

Figure 3G:
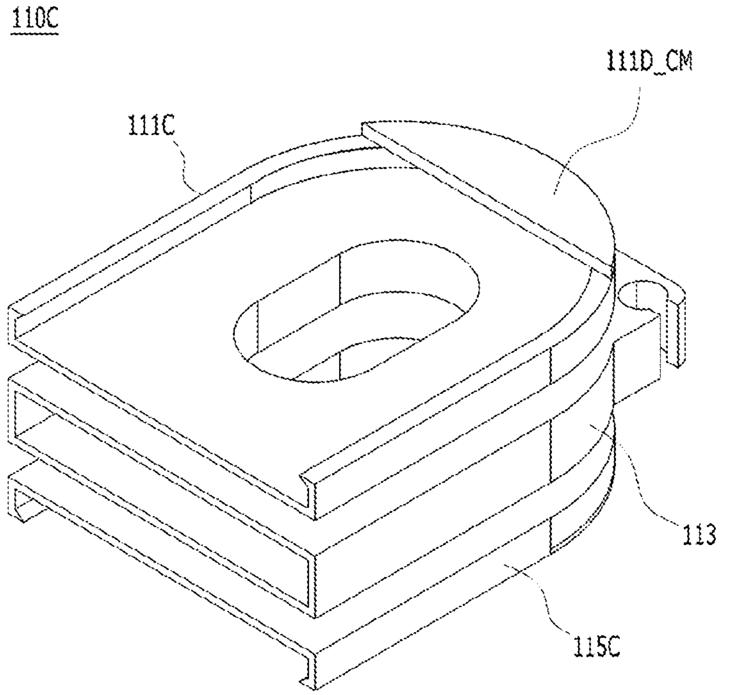
Figure 3H:
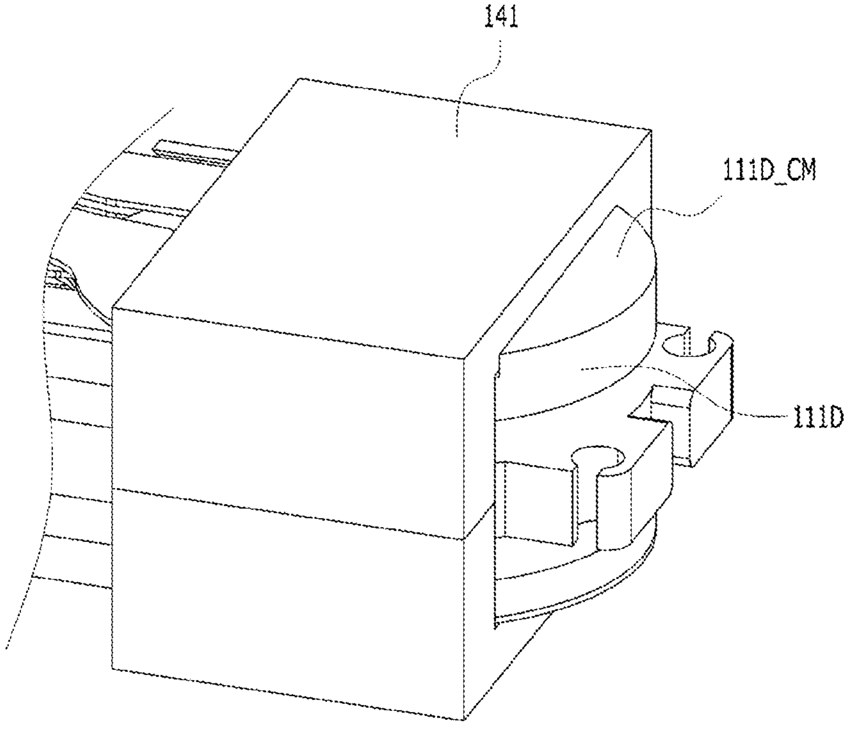

According to still another aspect of the present embodiment, as shown in FIG. 3G, a bobbin 110D may include a fixing portion 111D_CM having an arc-shaped planar shape. Also, in this case, as shown in FIG. 3H, it is preferable for a straight side surface of the fixing portion 111D_CM to extend so as to contact one side surface of the core part 140, which faces the straight side surface of the fixing portion when the core part 140 is coupled to the bobbin 110D.

Meanwhile, the middle receiving part of the bobbin may be modified in order to fix the core part 140. This will be described with reference to FIGS. 31 and 3J.

Figure 3I:
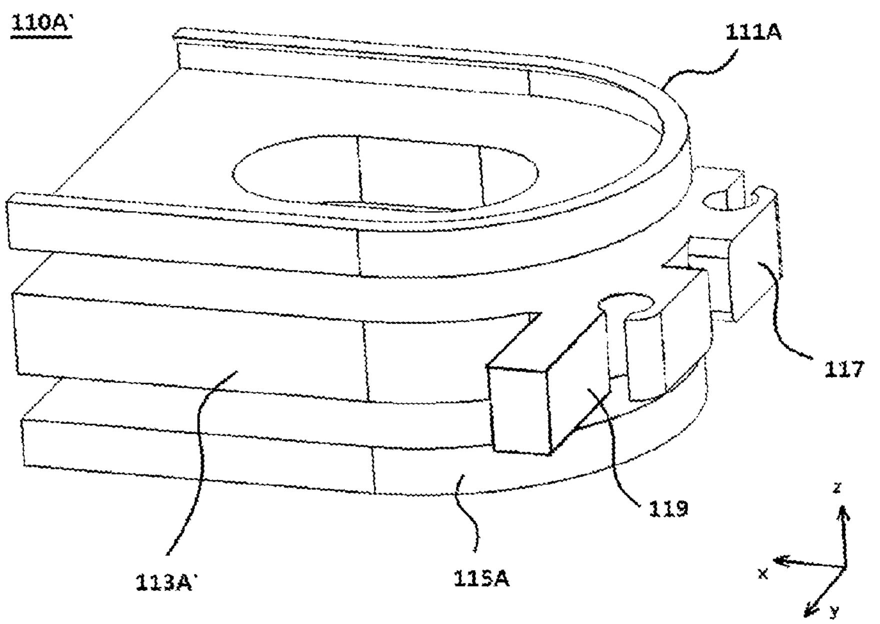
Figure 3J:
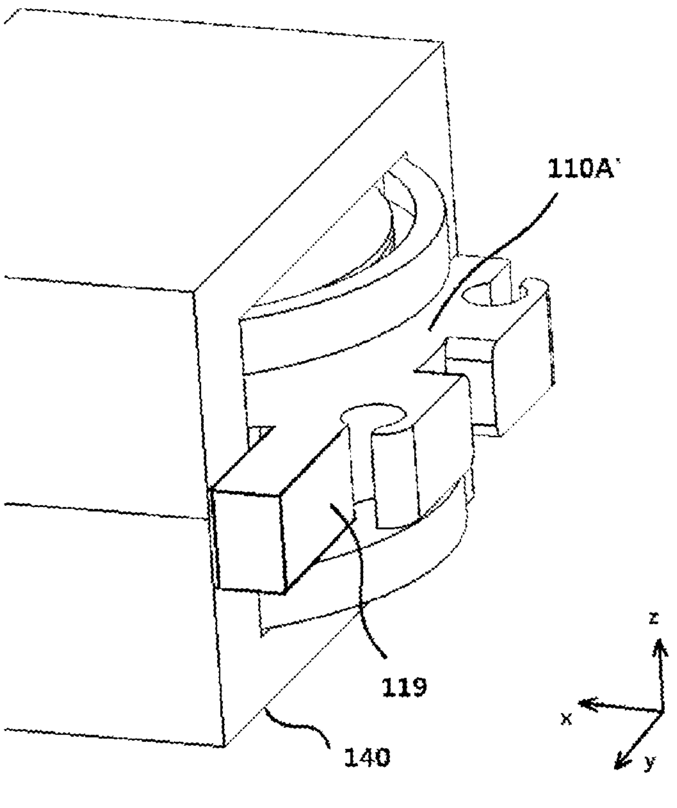

Referring to FIG. 3I, a bobbin 110A' including a middle receiving part 113A', which is a modification of the middle receiving part of the bobbin 110A shown in FIGS. 3A and 3B, is illustrated. Specifically, fixing portions 119 may be disposed at both sides of the middle receiving part 113A' so as to extend from the curved surfaces adjacent to the winding-fixing part 117 among the outer side wall of the middle receiving part 113A' in a direction (e.g. the Y-axis direction) intersecting the direction in which the secondary coil unit is inserted (e.g. the X-axis direction). Also, in this case, as shown in FIG. 3J, it is preferable for one side surface of each of the fixing portions 119 to extend so as to contact one side surface of the core part 140, which faces the one side surface of each of the fixing portions 119 when the core part 140 is coupled to the bobbin 110A'.

Although the upper receiving parts 111A, 111B, 111C and 111D have been described above with reference to FIGS. 3A to 3I, since the lower receiving parts 115A, 115B, 115C and 115D are vertically symmetrical with the upper receiving parts 111A, 111B, 111C and 111D, the components including the fixing portions 111B_PT, 111C_PT and 111D_CM may be similarly applied to the lower receiving parts 115A, 115B, 115C and 115D.

Figure 4:
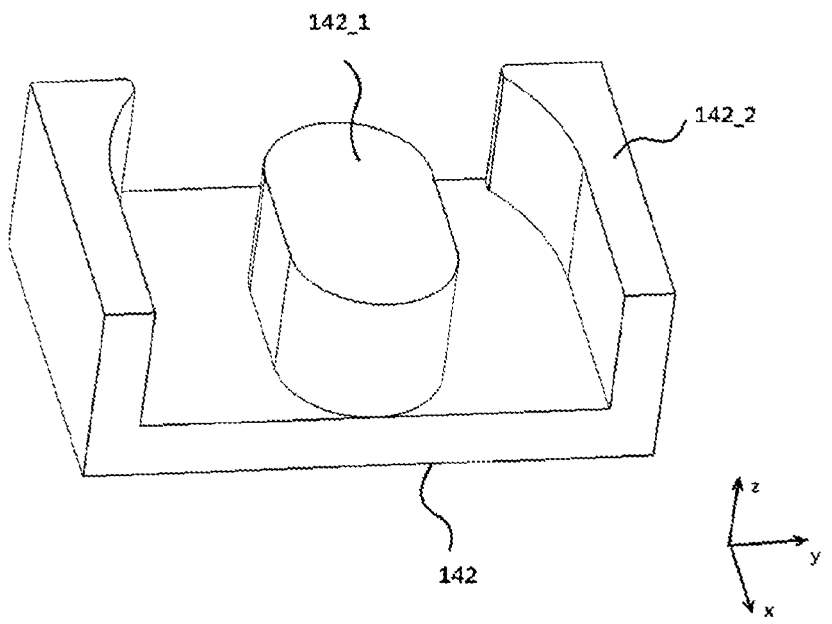
FIG. 4 is a perspective view showing the external appearance of an example of a lower core according to the embodiment.

Next, the configuration of the core part 140 will be described with reference to FIG. 4. FIG. 4 is a perspective view showing the external appearance of an example of a lower core. Although a lower core 142 of the core part 140 will be described with reference to FIG. 4, the following description may also apply an upper core 141 on the assumption that the upper core 141 is vertically symmetrical with the lower core 142.

Referring to FIG. 4, the lower surface of the lower core 142 may have a rectangular planar shape including a long side extending in one direction (e.g. the Y-axis direction) and a short side extending in another direction (e.g. the X-axis direction) intersecting the one direction.

In addition, the lower core 142 may include a central leg 142_1 (or a central portion) having a track-shaped column shape and side portions 142_2 disposed at both sides of the lower core 142 that face each other around the central leg 142_1. In this case, in order to couple the lower core 142 to the bobbin 110 in the form of surrounding the bobbin 110, a receiving hole may be formed to have a track-shaped planar shape by cutting off an area between the inner side surfaces of the side portions 142_2 and the side surface of the central leg 142_1, and may correspond to the size and shape of the bobbin 110. This type of core is referred to as an "EPC" core.

Meanwhile, the central leg 142_1 may be inserted into the through-hole TH in the bobbin 110. In addition, when coupled to the bobbin 110, the central leg (not shown) of the upper core 141 and the central leg 142_1 of the lower core 142 may come into contact with each other, or may be spaced apart from each other by a predetermined distance (e.g. 100 μm).

Next, the configuration of a plurality of conductive plates constituting the secondary coil unit will be described with reference to FIGS. 5 and 6.

Figure 5:
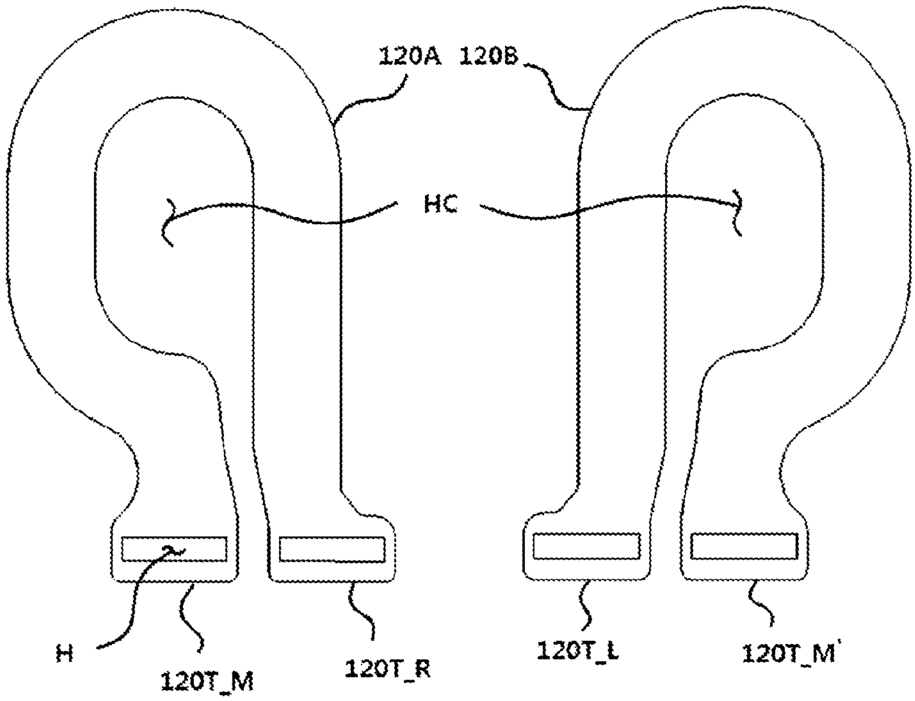
FIG. 5 shows the planar shapes of two types of conductive plates according to the embodiment.

FIG. 5 shows the planar shapes of two types of conductive plates according to the embodiment.

First, referring to FIG. 5, two types of conductive plates 120A and 120B having different planar shapes are illustrated. Since the first type of conductive plate 120A has the same shape as the second type of conductive plate 120B, except that the left and right sides thereof are inverted compared to the second type of conductive plate 1208, the following description will focus on the first type of conductive plate.

The conductive plate 120A according to the embodiment may have an open annular planar shape having two end portions 120T_M and 120T_R in order to form one turn of the secondary coil unit. In this specification including FIG. 5, each of the conductive plates 120A and 120B is illustrated as having an open track shape centered on a track-shaped hollow portion HC, but this is merely given by way of example. The planar shape may be an open circular/elliptical annular shape or an open polygonal annular shape.

For example, the first type of conductive plate 120A may have a "q"-shaped planar shape. In addition, the second type of conductive plate 120B, which is bilaterally symmetrical with the first type of conductive plate 120A, may have a "p"-shaped planar shape. Here, in the first type of conductive plate 120A, since the first end portion 120T_M is connected to the ground, it may be referred to as a ground end portion, and since the second end portion 120T_R is connected to one signal line, it may be referred to as a first signal end portion. Similarly, the second type of conductive plate 121 may also have one ground end portion 120T_M' and one signal end portion 120T_L. The signal end portion 120T_L may be located opposite the first signal end portion 120T_R, and may be referred to as a second signal end portion.

Therefore, when four conductive plates are used for one coil part constituting the secondary coil unit 120 and 130, e.g. the upper coil part 121, a total of four ground end portions, two first signal end portions, and two second signal end portions are provided. The four ground end portions, the two first signal end portions, and the two second signal end portions may at least partially overlap each other in the vertical direction, or may be aligned with each other in the vertical direction.

In this case, the two first signal end portions, the four ground end portions, and the two second signal end portions may be electrically connected to each other via the engaging parts 130, but the remaining portions actually constituting the turns may be insulated from each other so as not to be in direct contact with each other.

In addition, each end portion may have therein a through-hole H through which the engaging part 130 passes. Although it is illustrated in FIG. 5 that one hole H having a rectangular planar shape is formed in each end portion, the number and position of holes may vary.

Figure 6:
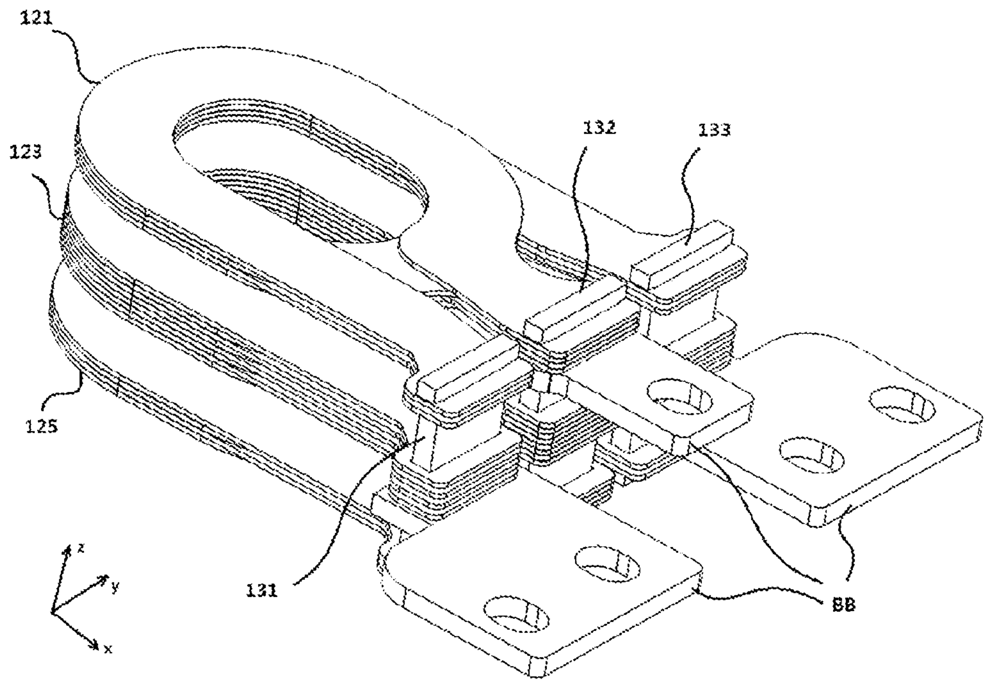
FIG. 6 is a view showing engagement of conductive plates according to an embodiment of the present disclosure.

FIG. 6 is a view showing engagement of the conductive plates according to an embodiment of the present disclosure.

Referring to FIG. 6, the secondary coil unit according to the embodiment may be composed of a total of sixteen conductive plates. In this case, the first type of conductive plates 120A and the second type of conductive plates 1208 may be alternately stacked in the vertical direction. Further, four conductive plates located at the upper position may form one group to constitute the upper coil part 121, eight conductive plates located at the middle position may form another group to constitute the middle coil part 123, and four conductive plates located at the lower position may form still another group to constitute the lower coil part 125. As illustrated, the upper coil part 121, the middle coil part 123, and the lower coil part 125 may overlap each other in the vertical direction in the state of being spaced a predetermined distance apart from each other. The spacing distance may vary depending on the heights of the upper connection part 112 and the lower connection part 114.

The conductive plates may be fixed to and electrically connected to each other through a soldering method. In order to realize soldering, metal bars 131, 132 and 133 may be inserted through the respective holes H in the conductive plates. In some embodiments, bus bars BB, which are electrically connected to the metal bars 131, 132 and 133 or through which the respective metal bars 131, 132 and 133 are inserted, may be further provided. When the transformer 100 is mounted onto a substrate, the bus bars BB may serve as electrical paths with the secondary coil and may also serve to fix the transformer 100 onto the substrate. In FIG. 6, the bus bars BB are disposed between the upper coil part 121 and the middle coil part 123 and between the middle coil part 123 and the lower coil part 125 in the thickness direction, but this is merely given by way of example. The bus bars BB may be disposed on the upper coil part 121 or under the lower coil part 125 in the thickness direction depending on the arrangement relationship with the substrate (not shown).

Meanwhile, in the embodiments described above, the conductive plates located at the outermost positions in the thickness direction, e.g. the conductive plate located at the uppermost position in the upper coil part 121 and the conductive plate located at the lowermost position in the lower coil part 125, are spaced apart from the core part 140 by the fixing portions 111B_PT, 111C_PT and 111D_CM or the top portion 111A_T of the bobbin 110. Unlike this, according to another embodiment of the present disclosure, a heat conduction element may be disposed between each of the conductive plates located at the outermost positions in the thickness direction and the core part. The heat conduction element may be in contact with one surface of each of the conductive plates located at the outermost positions in the thickness direction and one surface of the core part that faces the one surface of the conductive plate. This will be described with reference to FIG. 7.

Figure 7:
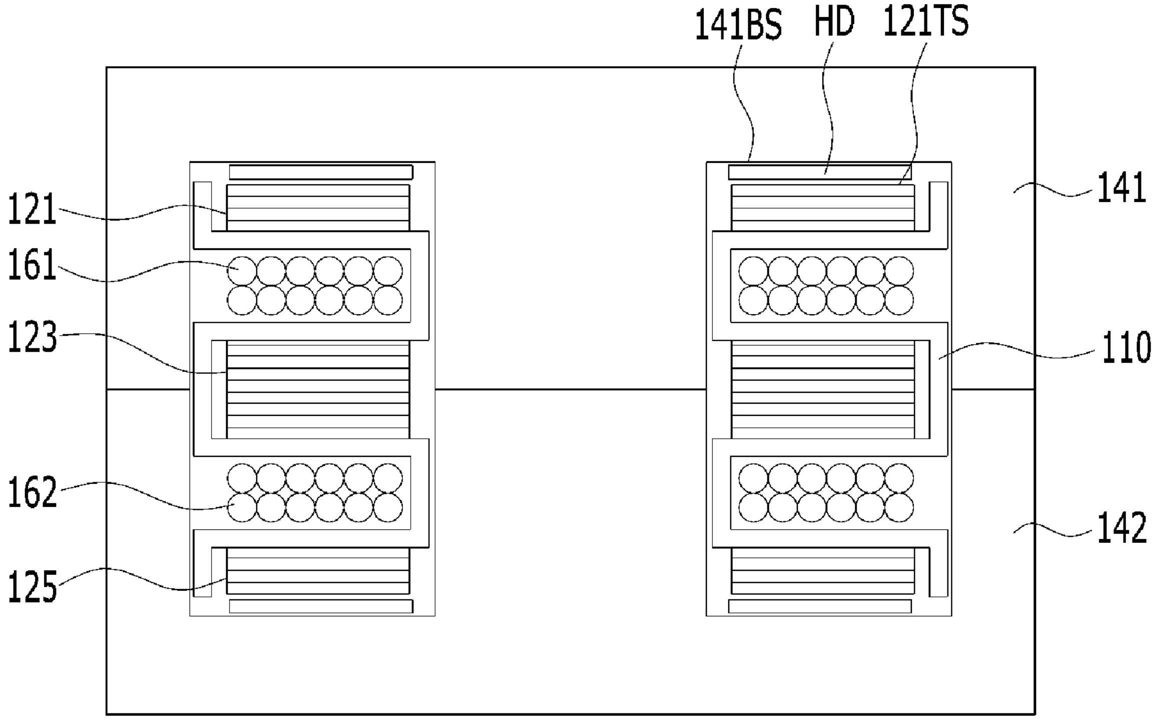
FIG. 7 is a cross-sectional view showing an example of a bobbin structure to which a heat dissipation unit according to another embodiment of the present disclosure is applied.

FIG. 7 is a cross-sectional view showing an example of a bobbin structure to which a heat dissipation unit according to another embodiment of the present disclosure is applied. In FIG. 7, the bobbin 110 may have any of the bobbin structures shown in FIGS. 3A to 3J. In addition, in FIG. 7, a configuration in which the electric wires 161 and 162 constituting the primary coil unit are wound is illustrated.

Referring to FIG. 7, a heat dissipation unit HD (e.g. a heat dissipation sheet) having excellent heat conductivity may be disposed between the conductive plate located at the outermost position in the thickness direction, e.g. the upper surface 121TS of the conductive plate disposed at the uppermost position in the upper coil part 121, and the lower surface 141BS of the upper core 141, which faces the upper surface 121TS. Here, the upper surface of the heat dissipation unit HD is in contact with the lower surface 141BS of the upper core 141, and the lower surface of the heat dissipation unit HD is in contact with the upper surface 121TS of the conductive plate disposed at the uppermost position. Due thereto, heat generated from the upper coil part 121 may be quickly transferred to the upper core 141. This configuration may be identically applied to the lower coil part 125 and the lower core 142.

Of course, when the transformer operates, the largest amount of heat is generated near the central leg of the core part 140. When the temperature of the core part 140 is higher, the heat from the core part 140 is temporarily transferred to the secondary coil unit via the heat dissipation unit HD more quickly than when the heat dissipation unit HD is absent. However, since the core part 140 functions to primarily dissipate heat to the bracket or the substrate, the heat from the secondary coil unit may be quickly dissipated via the core part 140.

Hereinafter, a transformer according to still another embodiment of the present disclosure will be described in more detail with reference to FIGS. 8 to 17.

Figure 8:
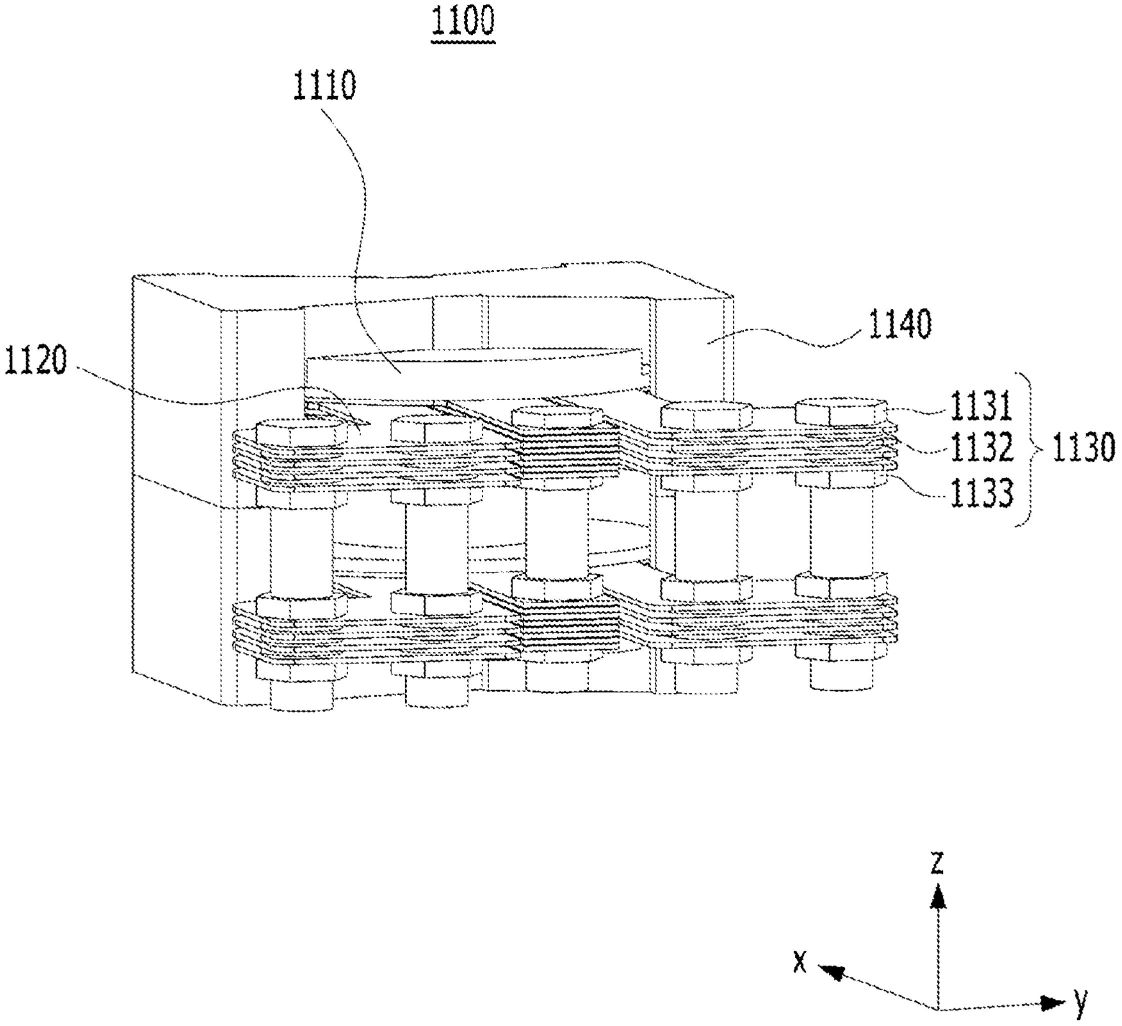
FIG. 8 is a perspective view showing an example of a transformer 100 according to still another embodiment of the present disclosure.
Figure 9:
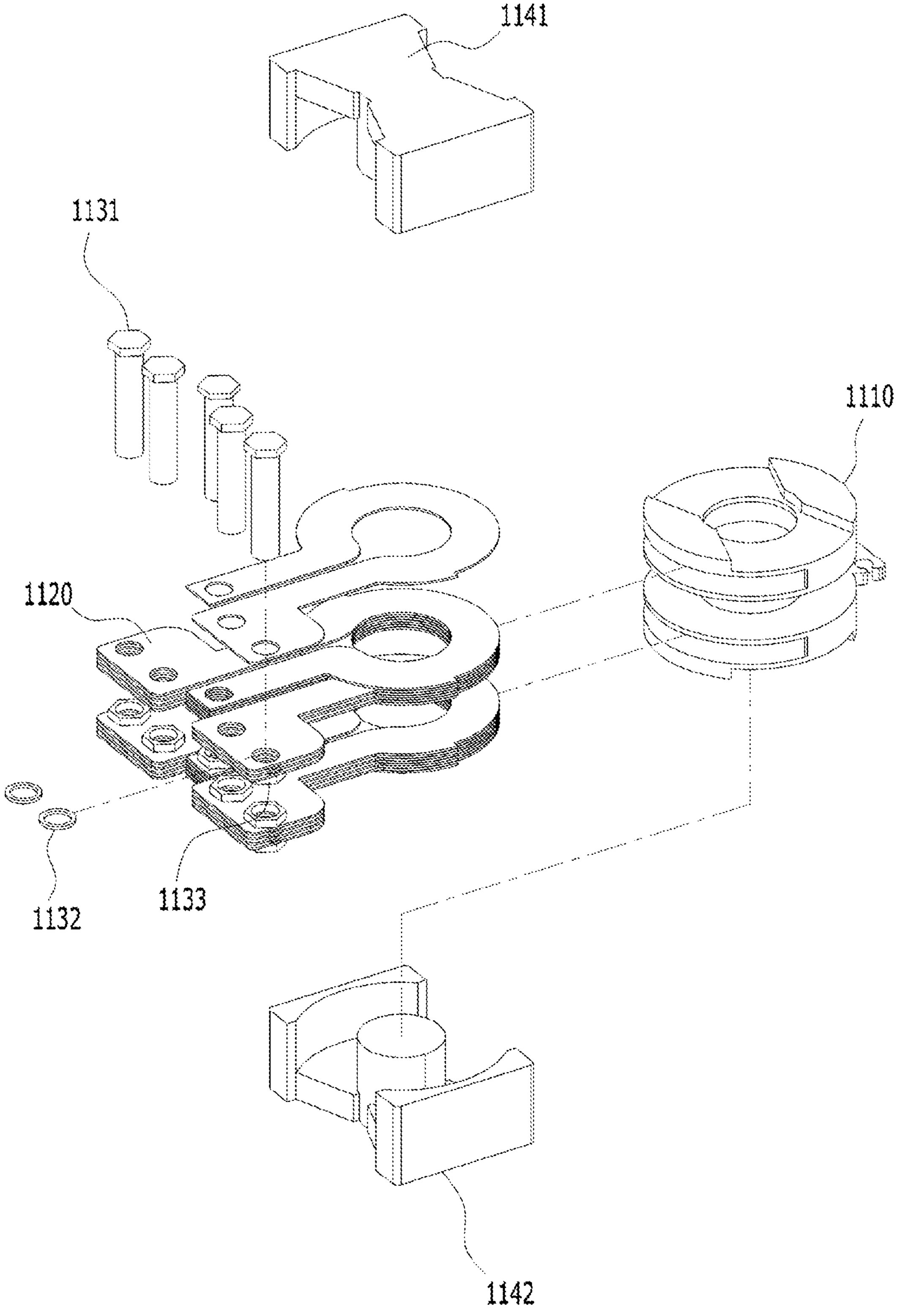
FIG. 9 is an exploded perspective view showing an example of a clip-coupled transformer according to still another embodiment of the present disclosure.

FIG. 8 is a perspective view showing an example of a transformer 1100 according to an embodiment of the present disclosure, and FIG. 9 is an exploded perspective view showing an example of a clip-coupled transformer according to still another embodiment of the present disclosure.

Referring to FIGS. 8 and 9, a clip-coupled transformer 1100 according to an embodiment of the present disclosure may include a bobbin 1110, a plurality of conductive plates 1120 inserted into the bobbin 1110, a plurality of engaging parts 1130 electrically connecting the plurality of conductive plates 1120 so as to constitute a secondary coil unit together with the plurality of conductive plates 1120 in an integral form, and a core part 1140 coupled to the outer side of the bobbin 1110 so as to surround at least a portion of the bobbin 1110.

Here, the transformer 1100 according to the embodiment may further include a conductive wire wound on the bobbin 1110 to constitute a primary coil unit, but an illustration thereof is omitted in the drawings of this specification. The primary coil unit (not shown) may take a multiple-winding form, in which a rigid conductive metal, e.g. a copper conductive wire, is wound several times.

The secondary coil unit 1120 and 1130 may transform and output a power signal received from the primary coil unit (not shown). In FIG. 8, the secondary coil unit 1120 and 1130 may be configured such that a total of eight conductive plates is stacked in the thickness direction (e.g. the z-axis direction). Each conductive plate may correspond to one turn in the secondary coil unit. That is, when eight conductive plates are used, the number of turns in the secondary coil unit may be eight, but this is merely given by way of example. A greater or smaller number of conductive plates may be used. In this case, the number of turns in the secondary coil unit may be proportional to the number of conductive plates.

For example, each of the plurality of conductive plates 1120 may be inserted into the bobbin 1110 in the x-axis direction.

The plurality of conductive plates 1120 may be electrically insulated from each other by insulation materials, except for electrical connection via the engaging parts 1130. For example, an insulation film may be disposed between adjacent conductive plates among the plurality of conductive plates in order to electrically insulate the conductive plates from each other. The insulation film may include components such as ketone and polyimide, without being necessarily limited thereto. In addition, the plurality of conductive plates 1120 may be spaced apart from each other in the thickness direction due to the thickness of washers 1132 of the engaging parts 1130 to be described later, thereby being insulated from each other. This will be described later with reference to FIG. 17.

In addition, the plurality of conductive plates 1120 may include a conductive metal, e.g. copper, without being necessarily limited thereto. For example, the plurality of conductive plates may include aluminum. When aluminum is used instead of copper, the thickness of each conductive plate may be approximately 60% greater than that when copper is used.

The bobbin 1110 may have a shape suitable for insulating the conductive wires (not shown) constituting the primary coil unit, the plurality of conductive plates 1120 constituting the secondary coil unit, and the core part 1140 from each other while accommodating or fixing at least a portion of each of the components 1120 and 1140.

The bobbin 1110 may include an insulation material, e.g. a resin material, and may be produced through a molding method. The more concrete shape of the bobbin 1110 will be described later with reference to FIG. 10.

The engaging part 1130 may include a bolt 1131, a washer 1132, and a nut 1132. The bolt 1131 may penetrate all of the plurality of conductive plates 1120 constituting the secondary coil unit in the vertical direction (e.g. the z-axis direction), and the washers 1132 may be disposed between the conductive plates that are located adjacent to each other and have the same shape. In addition, the nut 1133 may serve to fix the conductive plates 1120 such that a predetermined number (e.g. four) of conductive plates 1120 are in close contact with each other. For example, a predetermined number of conductive plates may be fixed between one nut 1133 and another nut 1133 or between the head of the bolt 1131 and the nut 1133.

The core part 1140, which has the characteristics of a magnetic circuit, may serve as a path for magnetic flux. The core part may include an upper core 1141 coupled from the upper side and a lower core 1142 coupled from the lower side. The two cores 1141 and 1142 may have shapes that are vertically symmetrical with each other, or may have shapes that are vertically asymmetrical with each other. The core part 1140 may include a magnetic material, e.g. iron or ferrite, without being necessarily limited thereto. The concrete shape of the core part 1140 will be described later with reference to FIG. 11.

Figure 10A:
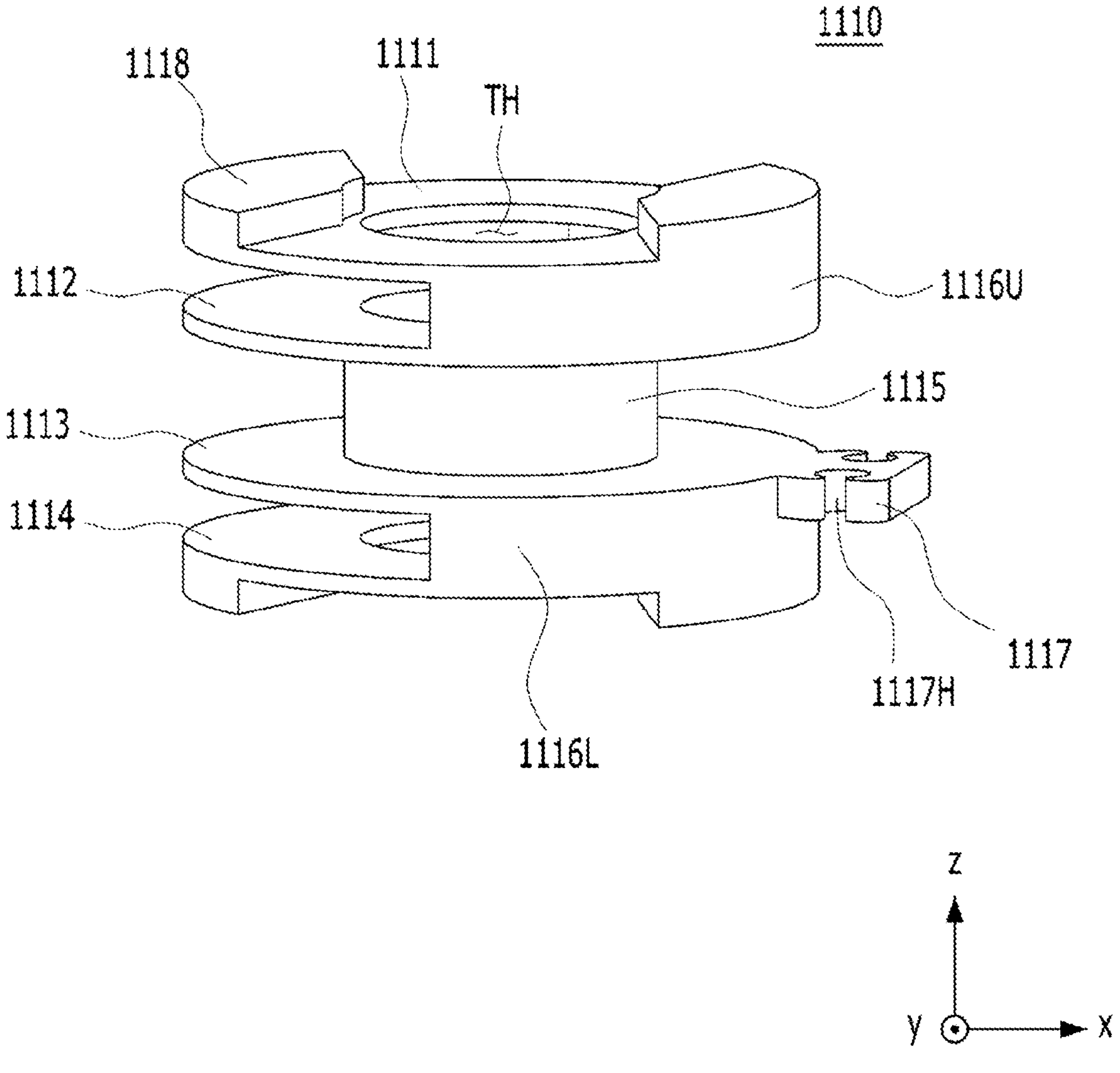
FIGS. 10A and 10B are respectively a side view and a front view of a bobbin according to still another embodiment of the present disclosure.
Figure 10B:
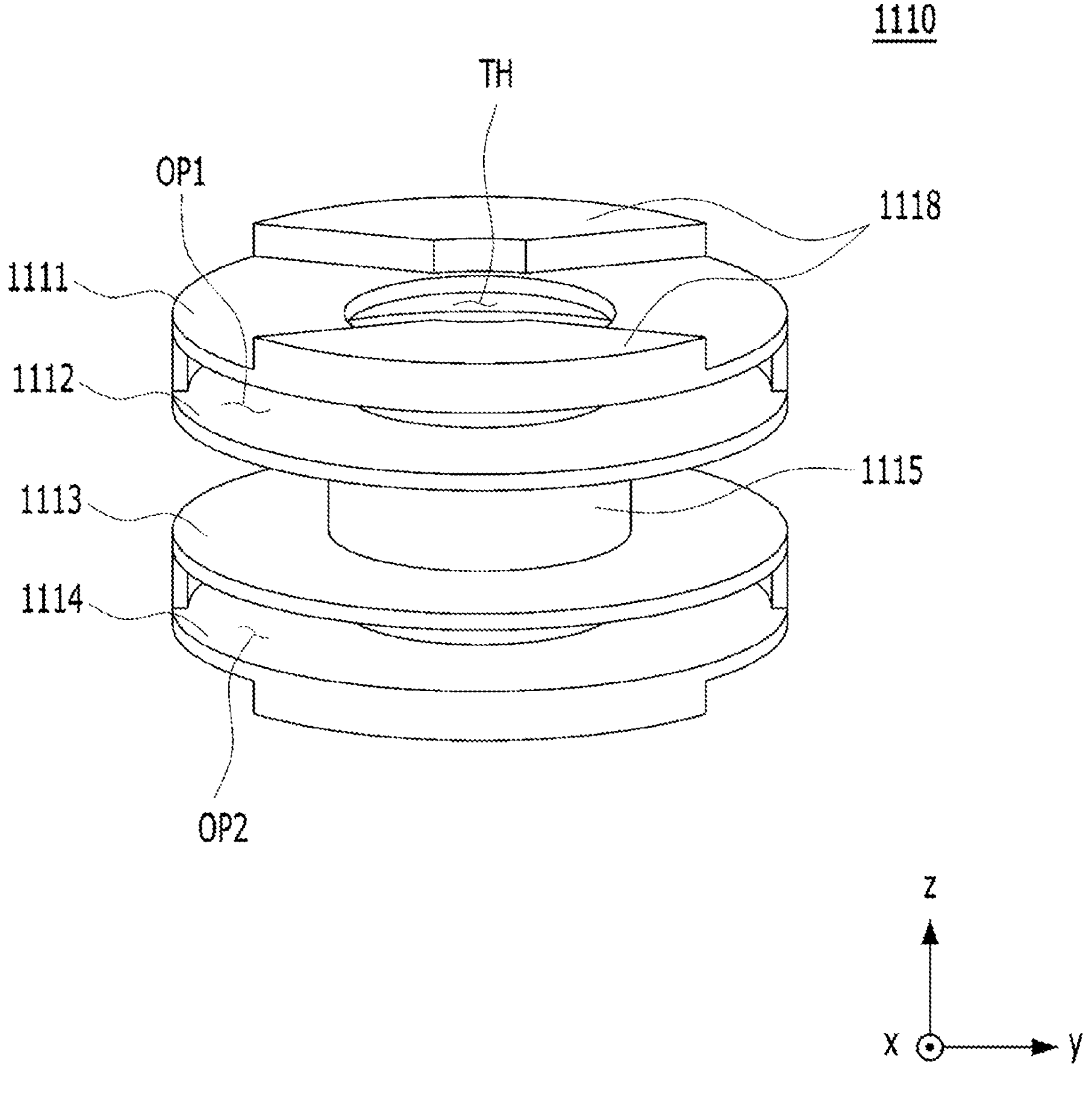

FIGS. 10A and 10B are respectively a side view and a front view of a bobbin according to still another embodiment of the present disclosure.

Referring to FIGS. 10A and 10B, the bobbin 1110 may include a first plate 1111, a second plate 1112, a third plate 1113, a fourth plate 1114, a connection part 1115 connecting the second plate 1112 and the third plate 1113, sidewall parts 1116U and 1116L, and a winding-fixing part 1117. Each of the plates 1111, 1112, 1113 and 1114 may have an annular planar shape. The plates 1111, 1112, 1113 and 1114 and the connection part 1115 may be aligned in the vertical direction about a through-hole TH when viewed in plan. Further, the inner surface of the connection part 1115 may define the sidewall of the through-hole TH.

The sidewall parts 1116U and 1116L may include an upper sidewall 1116U disposed between the first plate 1111 and the second plate 1112 and a lower sidewall 1116L disposed between the third plate 1113 and the fourth plate 1114. Each of the sidewalls 1116U and 1116L may have an arc-shaped planar shape. A first opening OP1 may be formed in the portion between the first plate 1111 and the second plate 1112 in which the upper sidewall 1116U is not disposed, and a second opening OP2 may be formed in the portion between the third plate 1113 and the fourth plate 114 in which the lower sidewall 1116L is not disposed. An upper coil part 1120T, which will be described later, may be inserted through the first opening OP1, and a lower coil part 1120U, which will be described later, may be inserted through the second opening OP2. In other words, the upper coil part 1120T may be received in the receiving hole defined by the first plate 1111, the second plate 1112, and the upper sidewall 1116U, and the lower coil part 1120U may be received in the receiving hole defined by the third plate 1113, the fourth plate 1114, and the lower sidewall 1116L.

The conductive wire (not shown) constituting the primary coil unit may be wound around the outer circumferential surface of the connection part 1115 in the space between the second plate 1112 and the third plate 1113. The winding-fixing part 1117 may include two holes 1117H, and one end and the other end of the conductive wire (not shown) constituting the primary coil unit may be fixedly fitted into the respective holes 1117H.

In addition, one or more protruding portions 1118 may be disposed on the upper surface of the first plate 1111 and the lower surface of the fourth plate 1114 in order to guide the coupling position of the core part 1140 and to prevent the core part 1140 from being rotated about the through-hole TH when the core part 1140 is coupled.

Figure 11A:
FIG. 11A is a plan view of a core part according to still another embodiment.
Figure 11B:
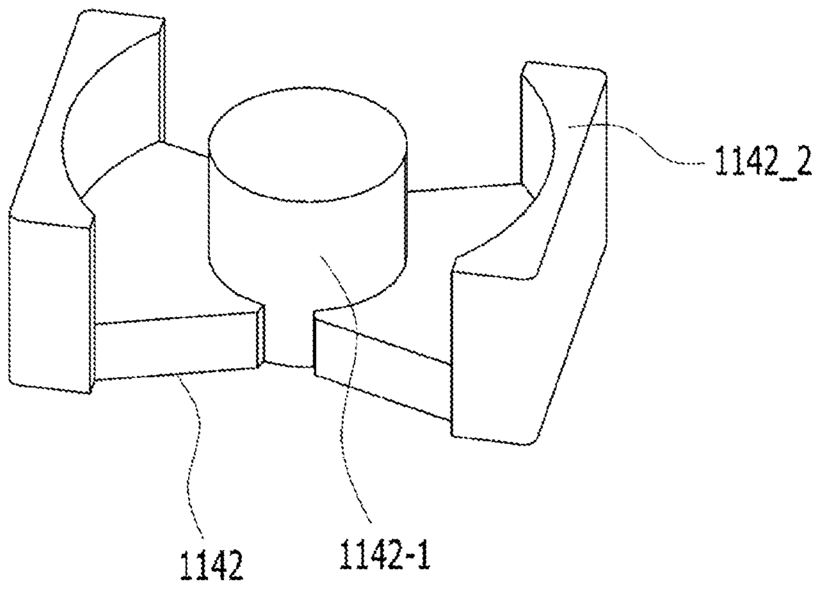
FIG. 11B is a perspective view of the external appearance of an example of a lower core.

Next, the configuration of the core part 140 will be described with reference to FIGS. 11A and 11B. FIG. 11A is a plan view of the core part according to the embodiment, and FIG. 11B is a perspective view of the external appearance of an example of the lower core. Referring to FIG. 11A, the core part 1140 may have a sandglass-shaped planar shape. The core part 1140 having such a planar shape may be referred to as a "pq"-type core. Due to this planar shape, the core part 1140 may have a short axis and a long axis. For example, in FIG. 11A, the short-axis direction may correspond to the x-axis direction, and the long-axis direction may correspond to the y-axis direction.

Any one (here, the lower core 1142) of the cores constituting the core part 1140 may include a central portion 1142_1 having a circular column shape and side portions 1142_2 disposed at both sides that face each other around the central portion 1142_1. In this case, in order to couple the lower core 1142 to the bobbin 1110 in the form of surrounding the bobbin 1110, a receiving hole may be formed in a toroidal shape between the inner circumferential surfaces of the side portions 1142_2 and the outer circumferential surface of the central portion 1142_1, and may correspond to the size of the bobbin 1110. Meanwhile, the central portion 1142_1 may be inserted into the through-hole TH in the bobbin 110. Meanwhile, the central portion 1142_1 may be referred to as a "central leg". When coupled to the bobbin 1110, the central leg (not shown) of the upper core 1141 and the central leg 1142_1 of the lower core 1142 may come into contact with each other, or may be spaced apart from each other by a predetermined distance (e.g. 100 μm).

Next, the configuration of a plurality of conductive plates constituting the secondary coil unit will be described with reference to FIGS. 12A to 14C.

Figure 12A:
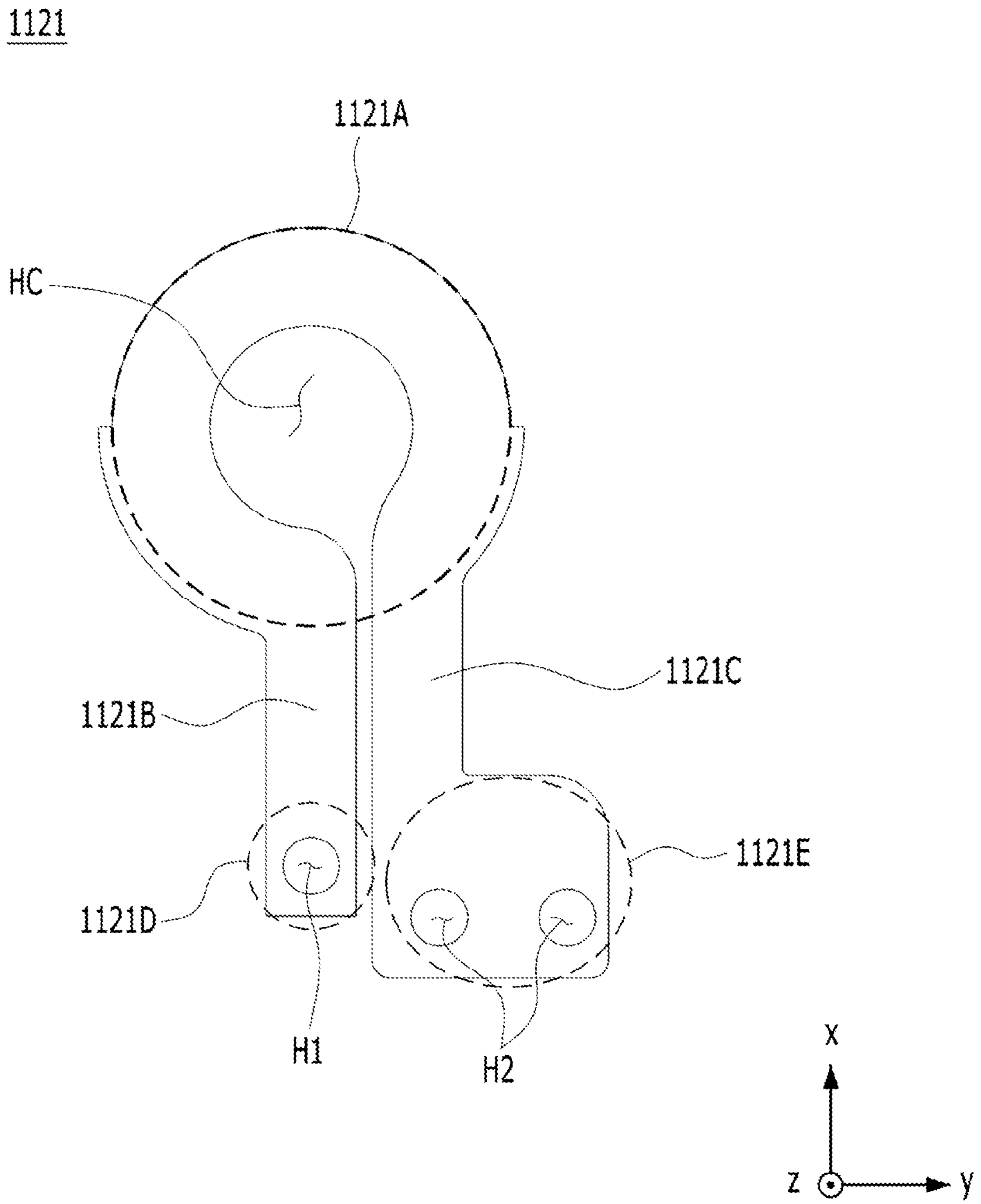
FIGS. 12A and 12B show the respective planar shapes of two types of conductive plates according to still another embodiment.
Figure 12B:
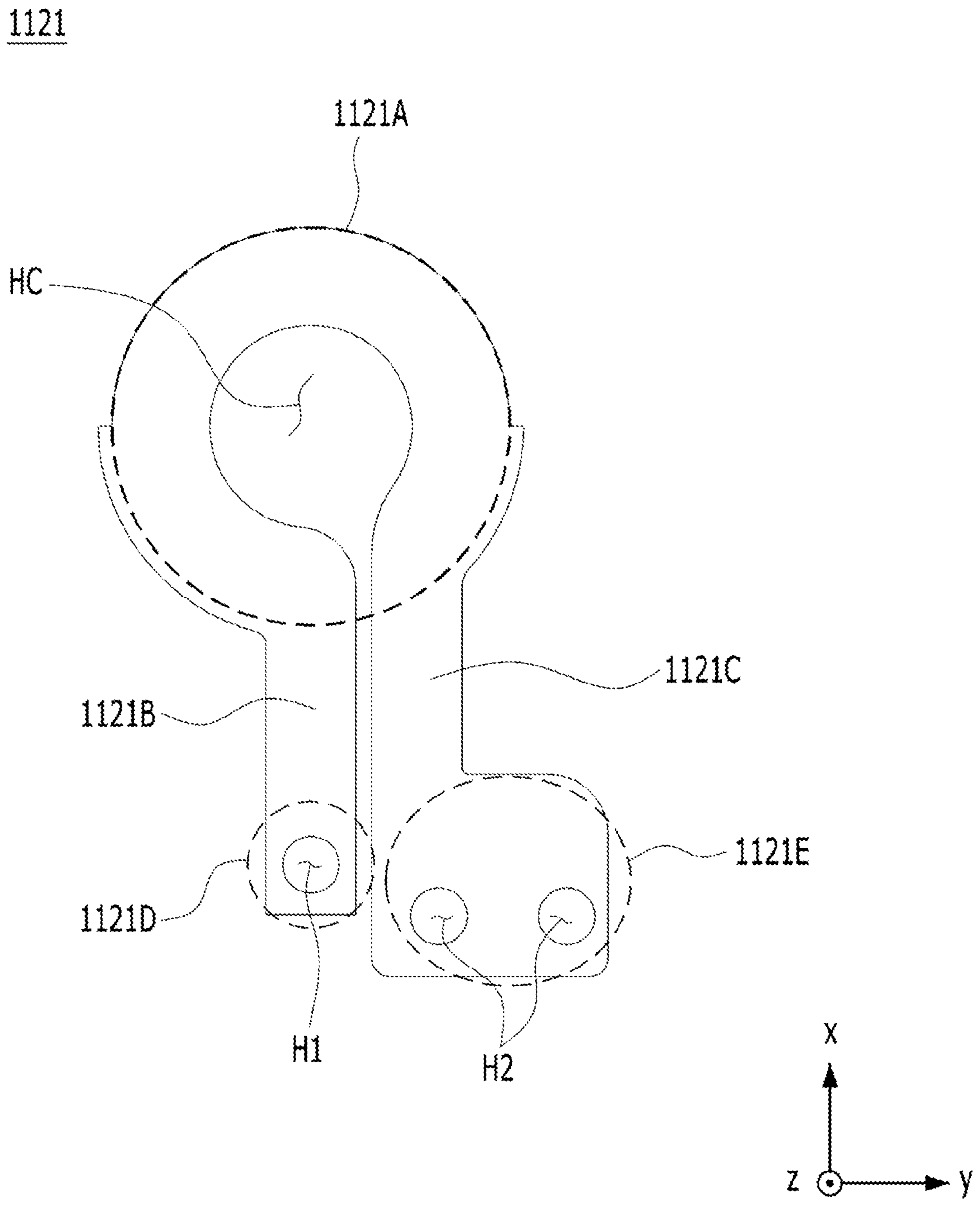
Figure 13A:
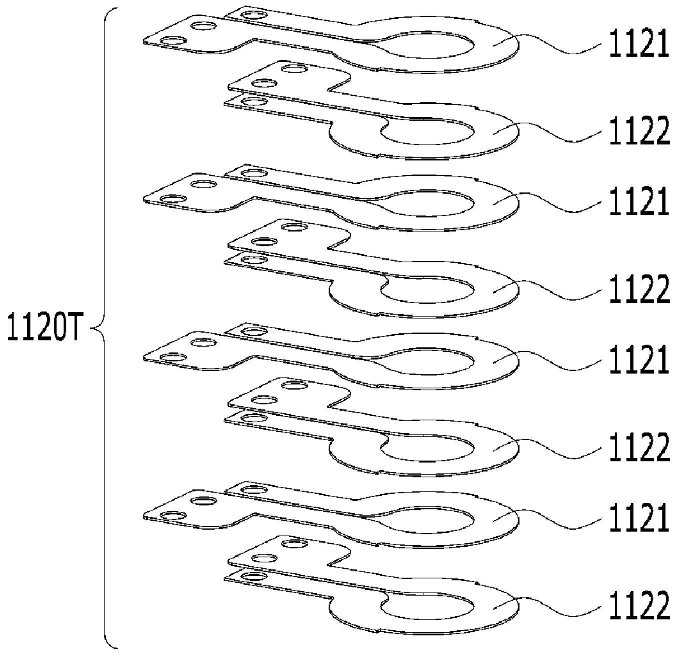
FIG. 13A is an exploded perspective view showing the configuration of a secondary coil unit according to still another embodiment.
Figure 13A:
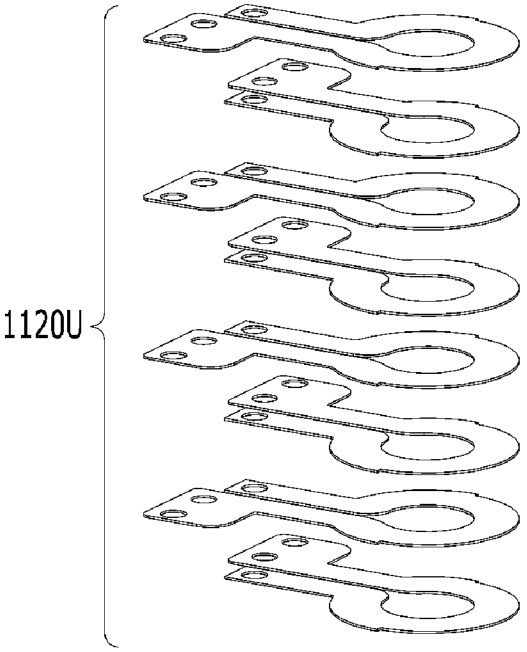
Figure 13B:
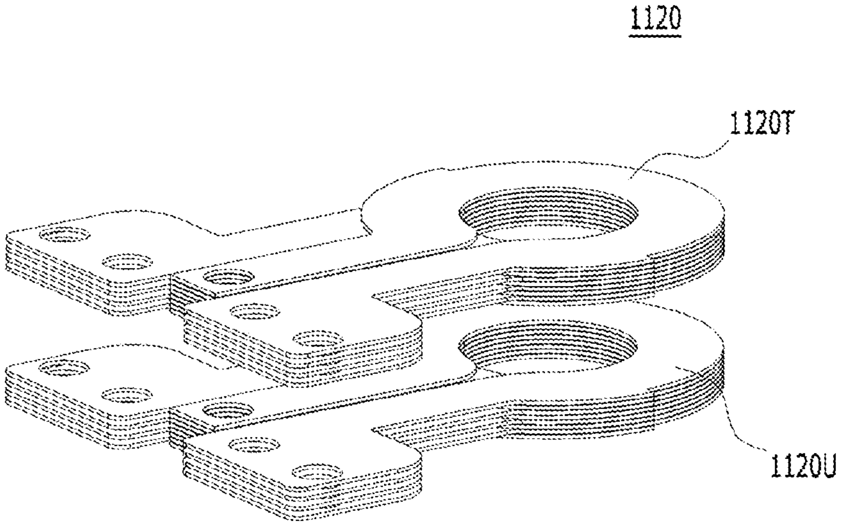
FIG. 13B is a perspective view showing engagement of a plurality of conductive plates.
Figure 13C:
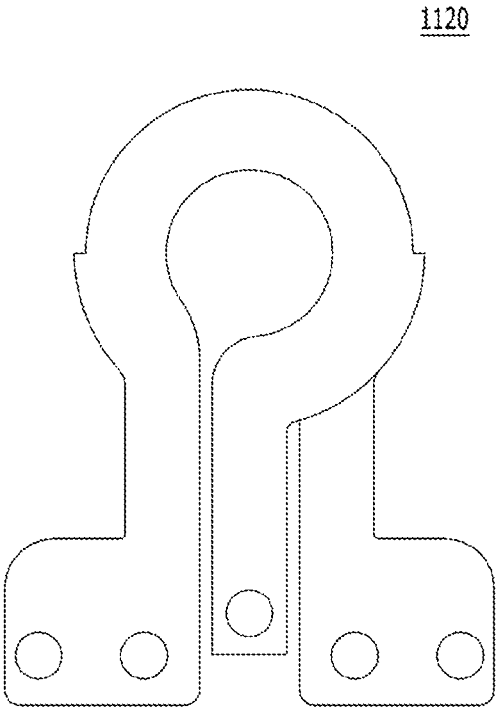
FIG. 13C is a plan view of the plurality of conductive plates shown in FIG. 13B.
Figure 14A:
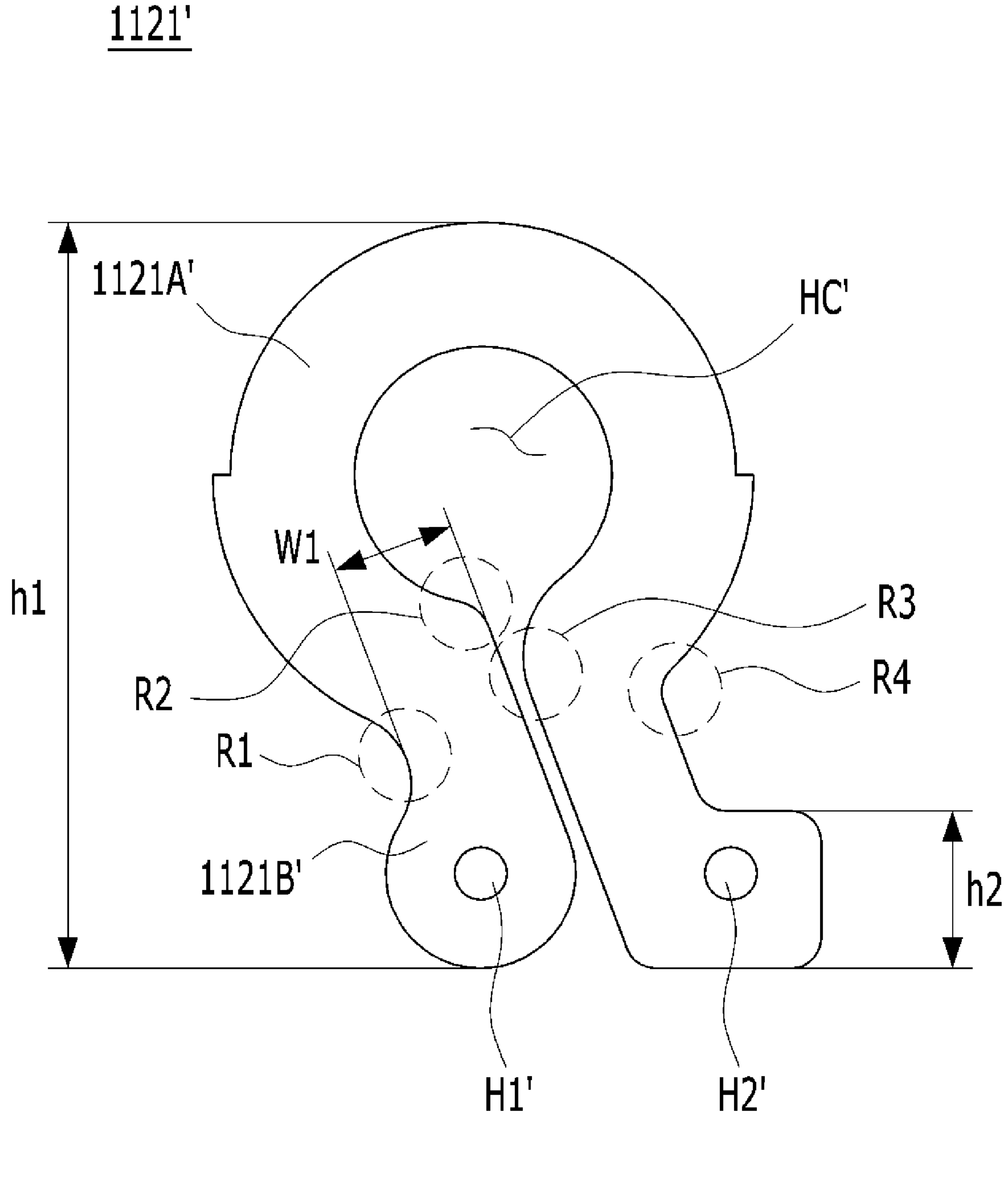
FIGS. 14A and 14B show the respective planar shapes of two types of conductive plates according to still another embodiment.
Figure 14B:
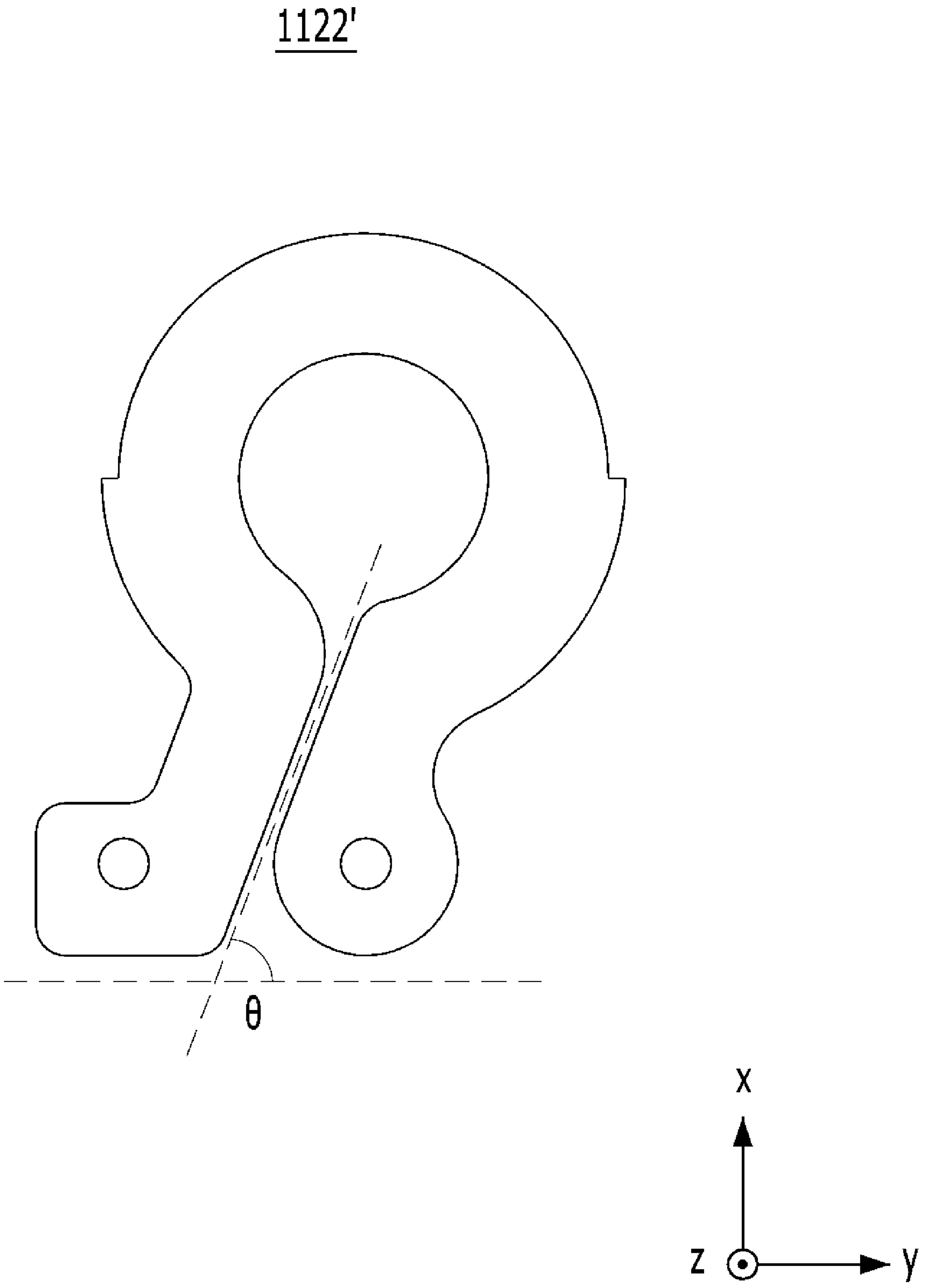
Figure 14C:
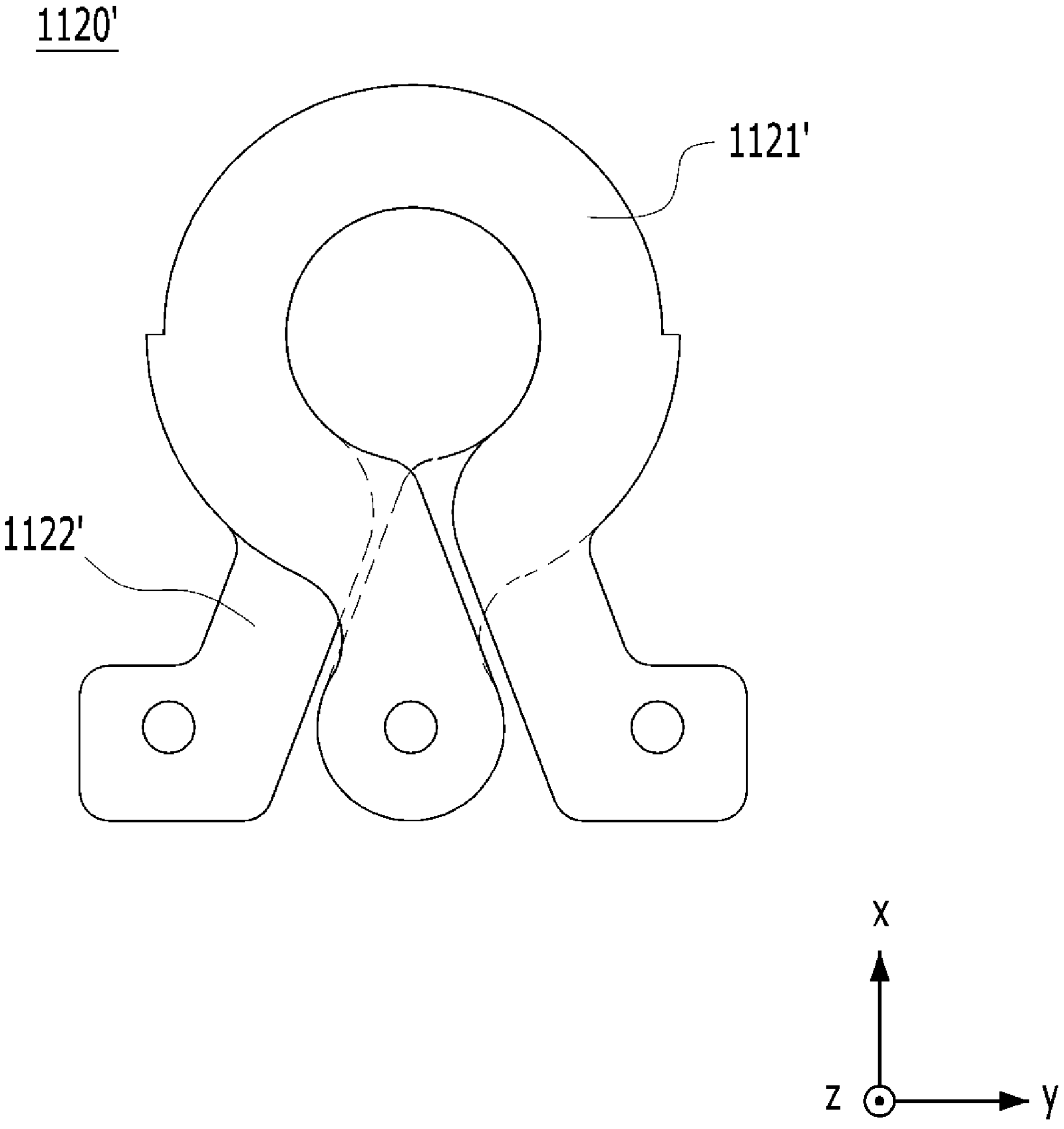
FIG. 14C is a plan view showing engagement of the conductive plates shown in FIGS. 14A and 14B.

FIGS. 12A and 12B show the respective planar shapes of two types of conductive plates according to still another embodiment. In addition, FIG. 13A is an exploded perspective view showing the configuration of a secondary coil unit according to still another embodiment, FIG. 13B is a perspective view showing engagement of the plurality of conductive plates, and FIG. 13C is a plan view of the plurality of conductive plates shown in FIG. 13B. In addition, FIGS. 14A and 14B show the respective planar shapes of two types of conductive plates according to still another embodiment, and FIG. 14C is a plan view showing engagement of the conductive plates shown in FIGS. 14A and 14B.

First, referring to FIGS. 12A and 12B, two types of conductive plates 1121 and 1122 having different planar shapes are illustrated. Since the first type of conductive plate 1121 has the same configuration as the second type of conductive plate 1122, except that the left and right sides thereof are inverted compared to the second type of conductive plate 1122, the following description will focus on the first type of conductive plate 1121 shown in FIG. 12A.

The conductive plate 1121 according to the embodiment may have an open annular planar shape having two end portions 1121D and 1121E in order to form one turn of the secondary coil unit. Although the conductive plate is illustrated as having a circular annular shape in still another embodiment including FIG. 12A, this is merely given by way of example. The planar shape may be an open circular/elliptical annular shape, an open polygonal annular shape, or an open track-type annular shape.

For example, the first type of conductive plate 1121 may actually form one turn of the secondary coil unit, and may include a coil portion 1121A, which has an open annular planar shape centered on a hollow portion HC, a first end portion 1121D, a second end portion 1121E, a first connection portion 1121B, which connects one end of the coil portion 1121A and the first end portion 1121D and extends in one axis direction (e.g. the X-axis direction), and a second connection portion 1121C, which connects the other end of the coil portion 1121A and the second end portion 1121E and extends in one axis direction (i.e. the x-axis). Therefore, the two connection portions 1121B and 1121C extend in a direction parallel to each other when viewed in plan.

The first type of conductive plate 1121 may have a "q"-shaped planar shape due to the coil portion 1121A, the first connection portion 1121B, and the second connection portion 1121C. In addition, the second type of conductive plate 1122, which is bilaterally symmetrical with the first type of conductive plate 1121, may have a "p"-shaped planar shape. Here, in the first type of conductive plate 1121, since the first end portion 1121D is connected to the ground, it may be referred to as a ground end portion, and since the second end portion 1121E is connected to one signal line, it may be referred to as a first signal end portion. Similarly, the second type of conductive plate 1121 may also have one ground end portion and one signal end portion. The signal end portion may be located opposite the first signal end portion 1121E, and may be referred to as a second signal end portion.

Therefore, when four conductive plates are used, a total of four ground end portions, two first signal end portions, and two second signal end portions are provided. The four ground end portions, the two first signal end portions, and the two second signal end portions may at least partially overlap each other in the vertical direction, or may be aligned with each other in the vertical direction.

The two first signal end portions, the four ground end portions, and the two second signal end portions may be electrically connected to each other via the engaging parts 1130, but the coil portion 1121A may be insulated from another coil portion so as not to be in direct contact therewith.

In addition, the end portions may have therein through-holes H1 and H2 through which the bolts 1131 of the engaging parts 1130 pass. The number and position of holes formed in each end portion may vary.

Meanwhile, as shown in FIG. 12B, protruding portions PT are provided on the outer periphery of the coil portion 1121A. When coupled to the bobbin 1110, the protruding portions may come into contact with the edges of the sidewall parts 1116U and 1116L, so the position at which the coil portion is fixed to the bobbin 1110 may be guided.

Next, referring to FIGS. 13A to 13C, the secondary coil unit according to still another embodiment may be composed of a total of eight conductive plates. In this case, the first type of conductive plates 1121 and the second type of conductive plates 1122 may be alternately stacked in the vertical direction. Further, four conductive plates located at the upper position may form one group to constitute the upper coil part 1120T, and four conductive plates located at the lower position may form another group to constitute the lower coil part 1120U. As illustrated, the upper coil part 1120T and the lower coil part 1120U may overlap each other in the vertical direction in the state of being spaced a predetermined distance apart from each other. The spacing distance may vary depending on the engagement relationship with the engaging parts 1130. For example, the spacing distance may be adjusted depending on the distance between the nuts 133 fastened to the bolt 1131. When the upper coil part 1120T and the lower coil part 1120U are received in the bobbin 1110, the primary coil unit (not shown) may be disposed between the upper coil part 1120T and the lower coil part 1120U.

In the above-described embodiment, the two connection portions 1121B and 1121C of the conductive plates 1121 and 1122 extend parallel to each other in one direction (e.g. the X-axis) perpendicular to the horizontal direction (e.g. the Y-axis). Unlike this, according to another aspect of the present embodiment, the two connection portions may extend so as to have a predetermined inclination (tilt) at a predetermined angle when viewed in plan, rather than being perpendicular to the horizontal direction.

This will be described with reference to FIGS. 14A to 14F. The following description will focus on differences from the conductive plates 1121 and 1122 shown in FIGS. 12A and 12B.

First, a conductive plate according to another aspect of the present embodiment will be described with reference to FIGS. 14A to 14C. FIG. 14A shows a first type of conductive plate 1121'. The first type of conductive plate 121' according to another aspect may have an open annular planar shape having two end portions 1121D' and 1121E' in order to form one turn of the secondary coil unit.

For example, the first type of conductive plate 1121' may actually form one turn of the secondary coil unit, and may include a coil portion 1121A', which has an open annular planar shape centered on a hollow portion HC', a first end portion 1121D', a second end portion 1121E', a first connection portion 11216', which connects one end of the coil portion 1121A' and the first end portion 1121D' and extends in one direction, and a second connection portion 1121C', which connects the other end of the coil portion 1121A' and the second end portion 1121E' and extends in one direction. Therefore, the two connection portions 1121B' and 1121C' extend in a direction parallel to each other when viewed in plan.

In this case, unlike the configuration shown in FIGS. 12A and 12B, the two connection portions 1121B' and 1121C' may extend in a direction different from the front direction of the bobbin (e.g. the x-axis direction). For example, the two connection portions 1121B' and 1121C' may extend in a direction inclined at a predetermined angle θ with respect to the horizontal direction (e.g. the y-axis direction), rather than being perpendicular to the horizontal direction.

Here, the direction in which the connection portions 1121B' and 1121C' extend may be a direction in which a straight line included in any one of the edge regions of the connection portions that include straight lines extends, or may be a direction in which sides that are adjacent and parallel to each other among the edges of the first connection portion 1121B' and the second connection portion 1121C' (e.g. the right side of the first connection portion and the left side of the second connection portion) extend.

Further, the predetermined angle θ may be an angle formed by the horizontal direction and the extension direction, or may be an angle formed by a line connecting the center of the hollow portion HC' and the center of any one through-hole (e.g. H2') and the horizontal direction. Further, when the direction in which the first connection portion 1121B' extends and the direction in which the second connection portion 1121C' extends are not parallel to each other, the predetermined angle θ may represent the direction in which any one of the first connection portion 1121B' and the second connection portion 1121C' extends.

For example, the predetermined angle θ may be greater than 0 degrees and less than 90 degrees, preferably 87 degrees or less, and more preferably about 60 degrees.

The reason for setting this range of the angle θ is to maximize the planar area of the coil portion 1121A' and to reduce the curvatures of the portions at which the curvatures change between the coil portion 1121A' and the connection portions 1121B' and 1121C' (or the boundary portions between the coil portion and the extending portions: R1, R2, R3 and R3). The large planar area of the coil portion 121A means that the capacity and efficiency are high compared to the size of the transformer. The small curvatures of the portions R1, R2, R3 and R4 at which the curvatures change between the coil portion 1121A' and the connection portions 1121B' and 1121C' mean that the occurrence of a current concentration phenomenon may be reduced at the corresponding portions R1, R2, R3 and R4.

In more detail, the coil portion 1121A' has an inner diameter curvature corresponding to the curvature of the hollow portion HC' and an outer diameter curvature that is smaller than the inner diameter curvature. The boundary portions R1, R2, R3 and R4 with the connection portions 1121B' and 1121C' have curvatures different from the inner diameter curvature or the outer diameter curvature. Here, any one of the four boundary portions R1, R2, R3 and R4 may have a curvature larger than the curvatures of the remaining ones of the boundary portions. For example, the fourth boundary portion R4 between the outer edge of the coil portion 1121A' and the second extending portion 1121C' may have a larger curvature than the first boundary portion R1, the second boundary portion R2, and the third boundary portion R3.

FIG. 14B shows the second type of conductive plate 1122'. Since the second type of conductive plate 1122' and the first type of conductive plate 1121' have the same structure, except that they are bilaterally symmetrical with each other, a duplicate description thereof will be omitted.

Meanwhile, when the conductive plates 1121' and 1122' according to another aspect of the present embodiment have the same range of angle θ as described above and the length H1 thereof in the X-axis direction is 48.47 mm, the width w1 of the first extending portion 1121B' may be 10 mm, and the height H2 of the second end portion 1121E may be 10 mm, but this is merely given by way of example. The sizes of the conductive plates 1121' and 1122' are not limited thereto.

Figure 14D:
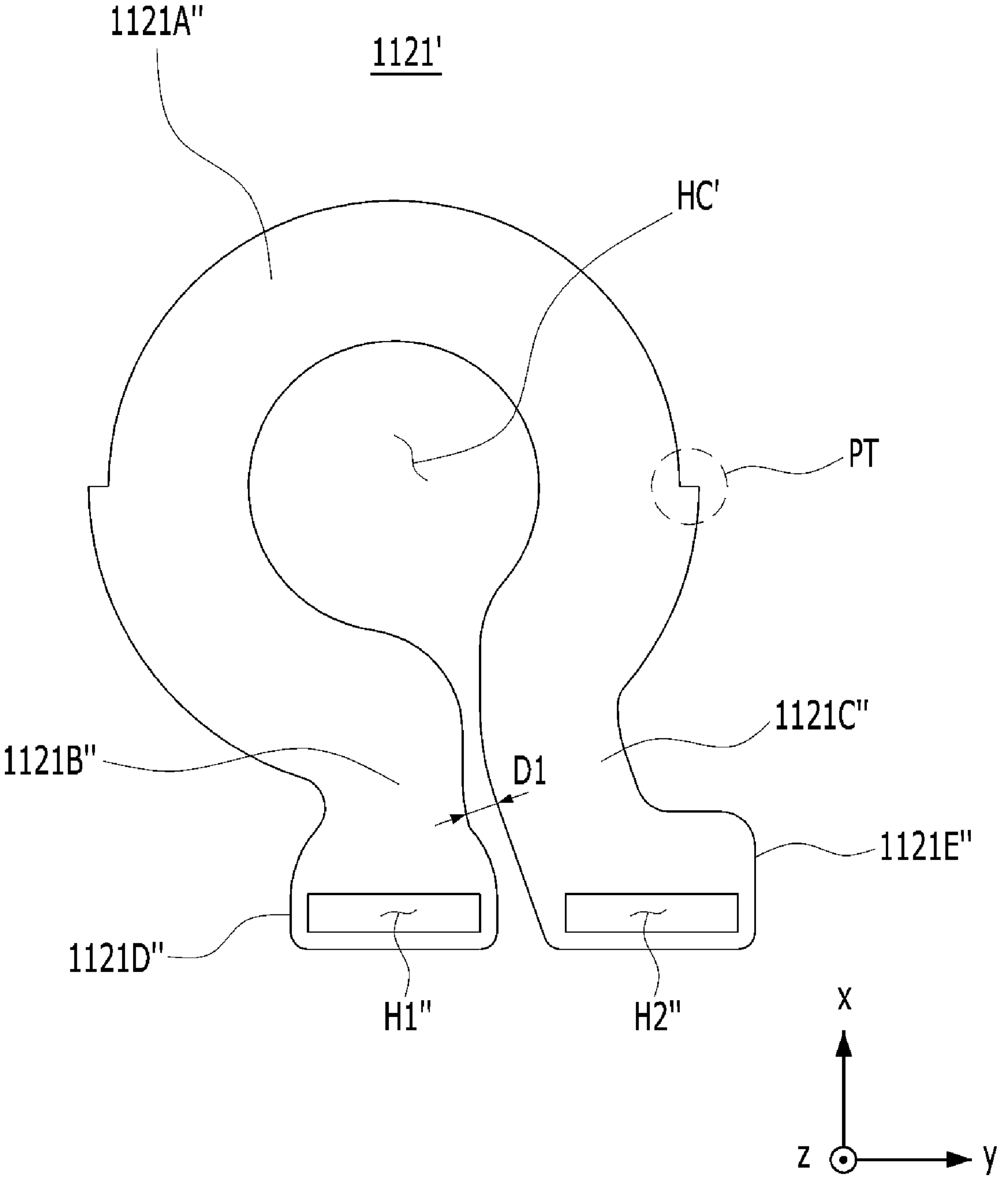
FIGS. 14D and 14E show the respective planar shapes of two types of conductive plates according to still another embodiment.
Figure 14E:
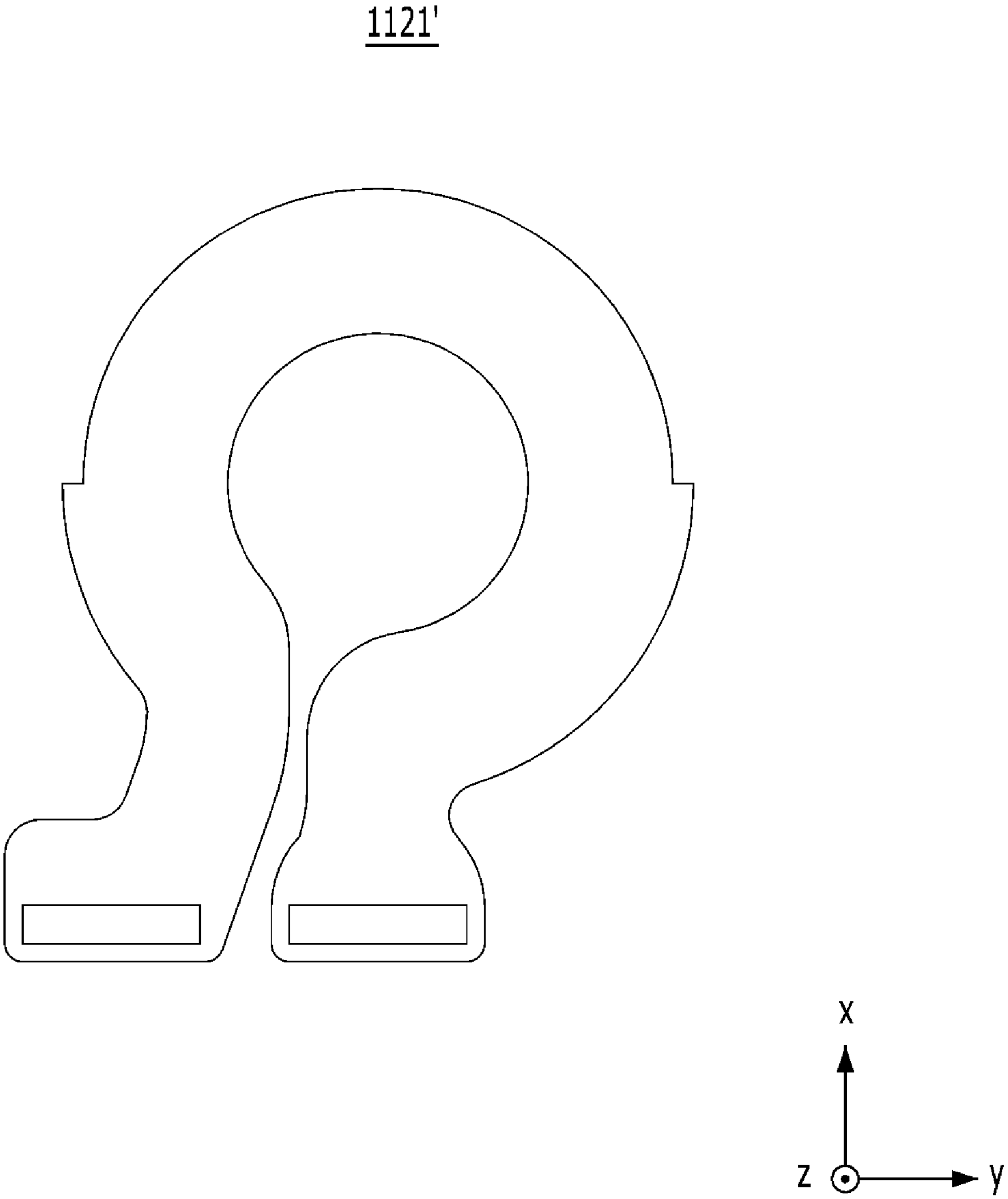
Figure 14F:
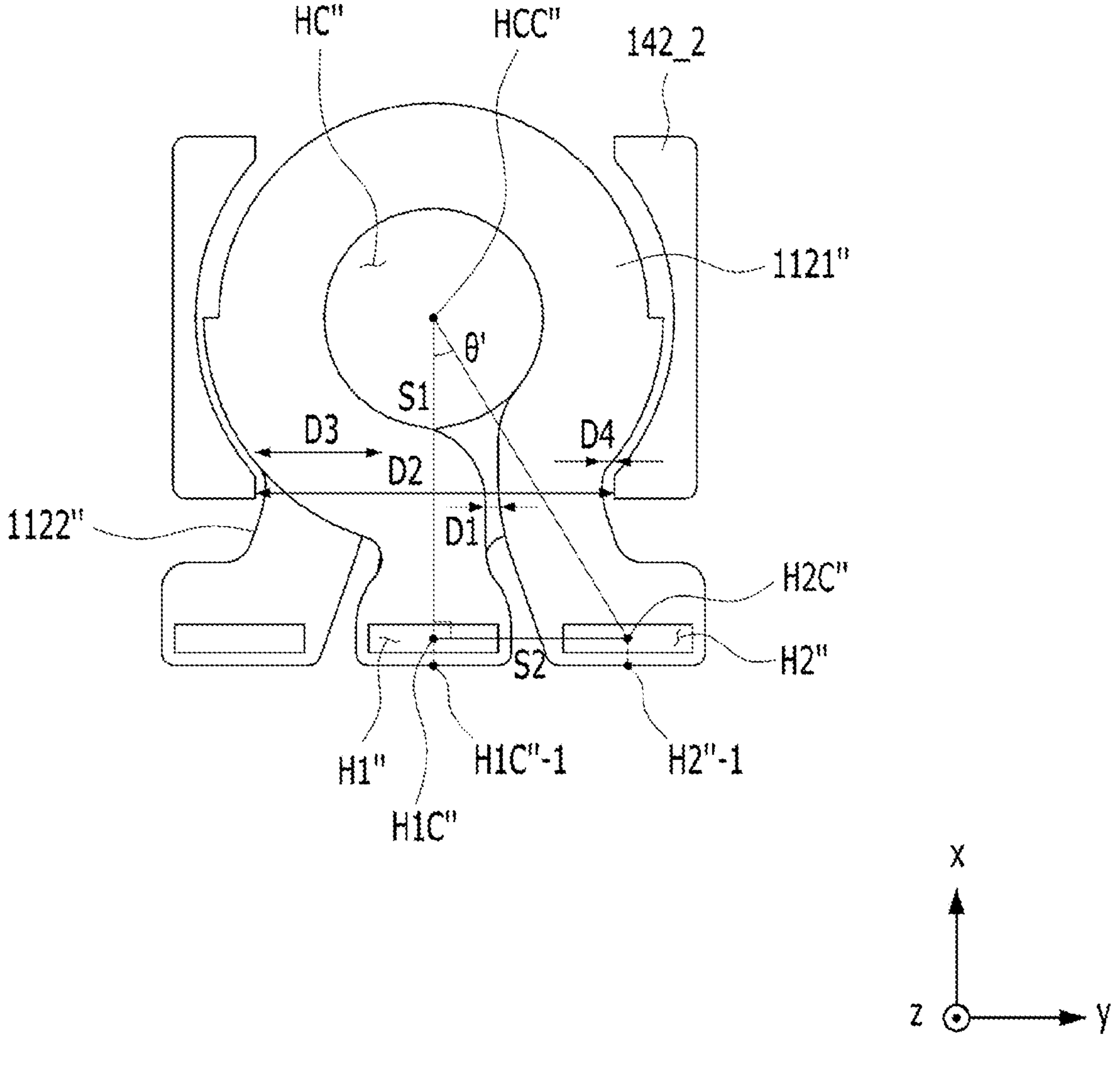
FIG. 14F is a plan view showing engagement of the conductive plates shown in FIGS. 14D and 14E.

Next, referring to FIGS. 14D to 14F, a first type of conductive plate 1121" and a second type of conductive plate 1122" according to still another aspect are illustrated. Since the first type of conductive plate 1121" and the second type of conductive plate 1122" have substantially the same configuration, except that they are bilaterally symmetrical with each other, the following description will focus on the first type of conductive plate 1121".

The first type of conductive plate 1121" according to still another aspect may have an open annular planar shape having two end portions 1121D" and 1121E" in order to form one turn of the secondary coil unit. The first end portion 1121D" may have therein a first through-hole H1", and the second end portion 1121E" may have therein a second through-hole H2".

For example, the first type of conductive plate 1121" may actually form one turn of the secondary coil unit, and may include a coil portion 1121A", which has an open annular planar shape centered on a hollow portion HC", a first end portion 1121D", a second end portion 1121E", a first connection portion 1121B", which connects one end of the coil portion 1121A" and the first end portion 1121D" and extends in the vertical direction (e.g. the x-axis direction), and a second connection portion 1121C", which connects the other end of the coil portion 1121A" and the second end portion 1121E" and extends in one direction.

The first connection portion 1121B" and the second connection portion 11210" are spaced apart from each other when viewed in plan, and the spacing distance D1 may change in the extension direction. However, the spacing distance D1 is preferably equal to or greater than the thickness of each of the conductive plates 1121" and 1122".

Unlike the configurations shown in FIGS. 12A, 12B, and 14A to 14C, one 1121C" of the two connection portions 1121B" and 11210" may extend in a direction different from the front direction (e.g. the x-axis direction) of the bobbin. In other words, the direction in which the second connection portion 1121C" extends may form a predetermined angle θ' with the direction in which the first connection portion 1121B" extends.

Here, the direction in which the first connection portion 1121B" extends may be defined as a direction that is oriented from the center HCC" of the hollow portion HC" toward the center H1C" of the first through-hole H1", and the direction in which the second connection portion 1121C" extends may be defined as a direction that is oriented from the center HCC" of the hollow portion HC" toward the center H2C" of the second through-hole H2". Unlike this, the direction in which the second connection portion 1121C" extends may be defined as a direction that is oriented from the center H2C" of the second through-hole H2" toward an edge H2"-1 of the second end portion 1121E" located therebelow in the vertical direction, rather than the direction that is oriented from the center HCC" of the hollow portion HC" toward the center H2C" of the second through-hole H2".

Hereinafter, the condition of the angle θ' formed by the direction in which the second connection portion 1121C" extends and the direction in which the first connection portion 1121B" extends will be described with reference to FIG. 14F.

As shown in FIG. 14F, when the center HCC" of the hollow portion HC", the center H1C" of the first through-hole H1", and the center H2C" of the second through-hole H2" are connected, a right triangle is formed. In the right triangle, each of two angles that are not a right angle is an acute angle, and the sum of the two angles is 90 degrees at all times. Therefore, the angle θ' needs to satisfy the range of "0<θ'<90".

However, the maximum size of the conductive plate is limited by the size of the entrance of the core 140, i.e. the shortest distance D2 between the side portions 1142_2 facing each other. In other words, the size D2 of the entrance of the core needs to be equal to or greater than the sum of the width D3 of the three connection portions located on the same line as the entrance of the core, the distance D1 between adjacent connection portions, and the tolerance D4 between the conductive plate and the two side portions of the core (i.e. 3*D3+2*D1+2*D4 D2).

Here, assuming that the minimum value of the tolerance D4 is 0.1 mm (i.e. 0.1 mm≤D4) and the core is a ferrite core of PQ40.5/30.3/28A standard, the minimum value of D2 is 27.8 mm. In addition, assuming that the thickness of one conductive plate is 1 mm, the distance D1 between adjacent connection portions is 1 mm. Under these assumptions, if the three connection portions have the same width D3, the width D3 of each connection portion is 8.5 mm ((27.8-2-0.2)/3).

Further, according to the trigonometric principle, tan θ'=S1/S2, and so the angle θ' is as follows: θ'=tan-1(S1/S2). In this case, if S1 is a constant, the value of angle θ' may vary depending on the length of S2.

Of course, the maximum value of θ' is determined to be less than 90 degrees, but the minimum value in actual implementation may be obtained as follows.

Assuming that the width D3 of each connection portion is 1 mm, S2=D3+D1, and so S2 is 2 mm. Since the length of S1 needs to be greater than the outer radius of the coil portion 1121A" and the vertical length of the first connection portion 1121B", the minimum value of S1 becomes 38.7 mm.

That is, since θ'=tan-1 (2/38.7) and the value of tan θ' is 0.0524 at the angle of about 3°, the minimum angle θ' may become 3°. As a result, θ' may be "3°<θ'<90°", preferably about 30°.

Meanwhile, according to another aspect of the present embodiment, the above-mentioned right triangle may be replaced with a right triangle formed by connecting the center HCC" of the hollow portion HC", an edge H1C"-1 of the first end portion 1121D" that is located vertically below the center H1C" of the first through-hole H1", and an edge H2"-1 of the second end portion 1121E" that is located vertically below the center H2C" of the second through-hole H2".

Figure 15:
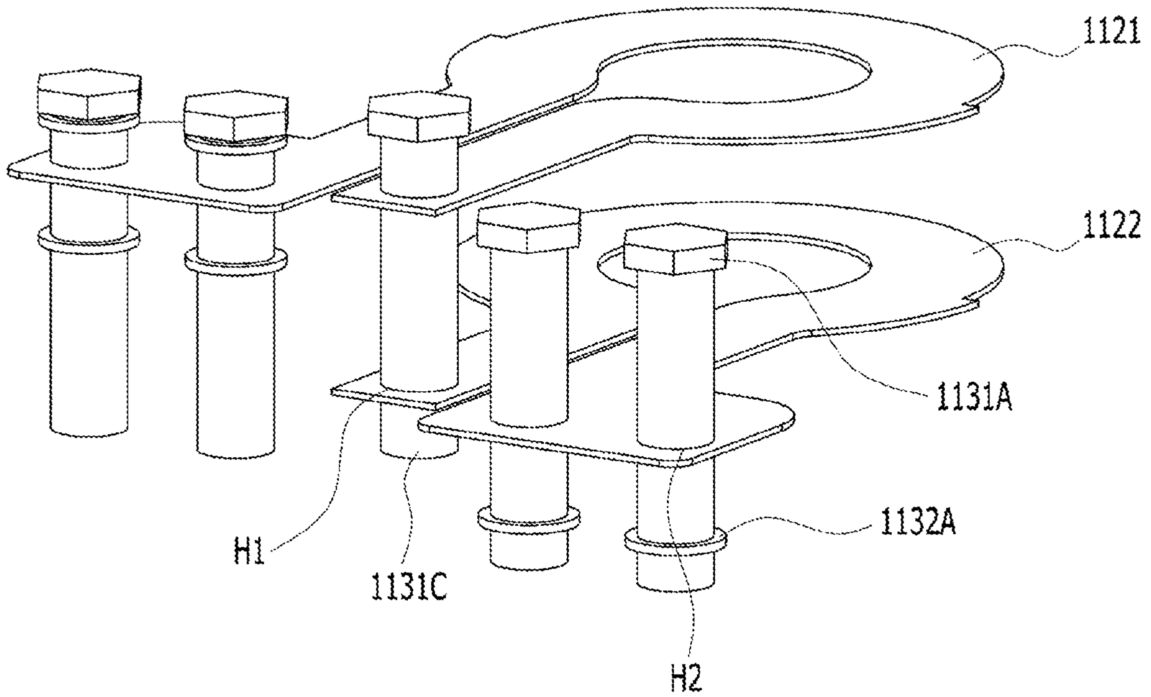
FIG. 15 is a view showing engagement of conductive plates according to still another embodiment of the present disclosure.

FIG. 15 is a view showing engagement of conductive plates according to still another embodiment of the present disclosure. In FIG. 15, for convenience of description, among a plurality of conductive plates constituting the secondary coil unit, only a first type of conductive plate 1121 located at the uppermost position and a second type of conductive plate 1122 disposed therebelow are illustrated.

Referring to FIG. 15, the first type of conductive plate 1121 and the second type of conductive plate 1121 are engaged by a bolt 1131C that passes through through-holes H1 formed in ground end portions thereof without a washer. Unlike this, a washer 1132A is disposed between a signal end portion of each of the first type of conductive plate and the second type of conductive plate and a signal end portion of the same type of conductive plate (not shown) located therebelow. In this case, the thickness of the washer may be the same as the thickness of the conductive plate. Due to this configuration, the ground end portions of the plurality of conductive plates constituting the secondary coil unit form a closed loop via the bolt 1131C, and the signal end portions thereof form a closed loop via the bolt 1131A while maintaining the distance therebetween via the washer 1132A.

Figure 16A:
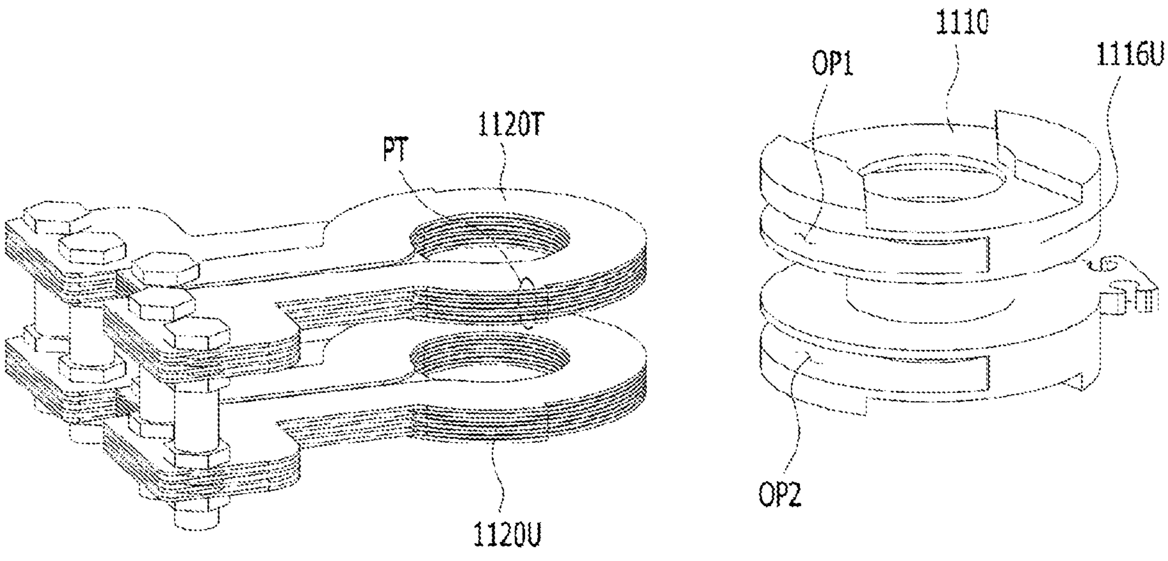
FIGS. 16A and 16B are views showing engagement of conductive plates and a bobbin according to still another embodiment of the present disclosure.
Figure 16B:
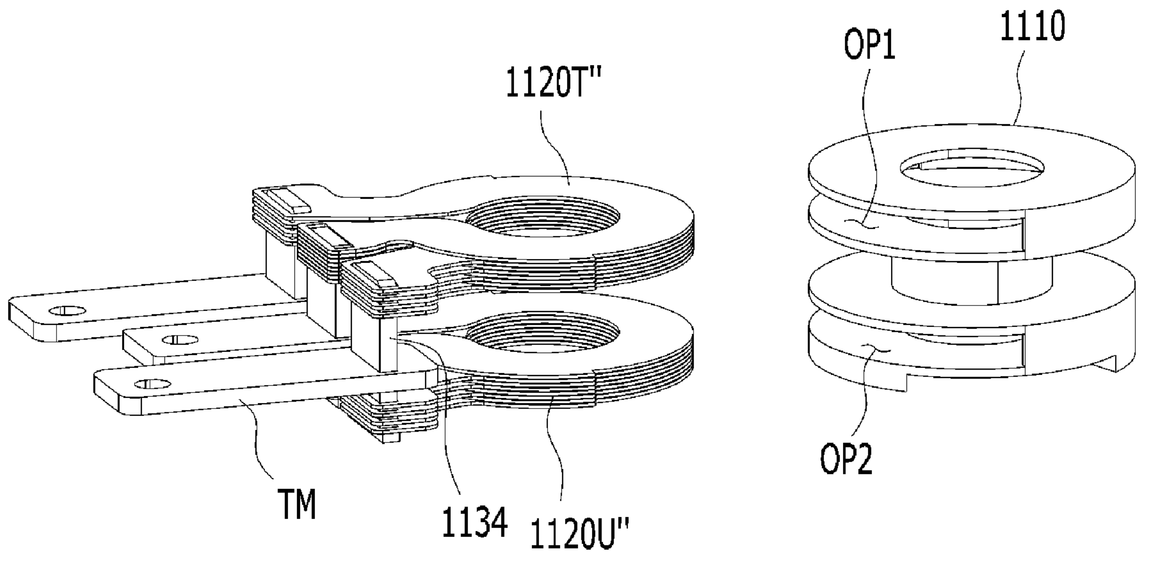

FIGS. 16A and 16B are views showing engagement of conductive plates and a bobbin according to still another embodiment of the present disclosure.

Referring to FIG. 16A, an upper coil part 1120T may be inserted into a bobbin through a first opening OP1, and a lower coil part 1120U may be inserted into the bobbin through a second opening OP2. Here, protruding portions PT formed at the side surfaces of the coil parts 1120T and 1120U may serve to guide the positions at which the coil parts 1120T and 1120U are received and fixed in the bobbin and to prevent the coil parts 1120T and 1120U from moving or rotating about a through-hole TH after insertion. For example, when the upper coil part 1120T is inserted into the bobbin 1110 through the first opening OP1, the protruding portions PT of the upper coil part 1120T come into contact with both edges of an upper sidewall 1116U defining the first opening OP1. Accordingly, after the protruding portions PT of the upper coil part 1120T come into contact with the edges of the upper sidewall 1116U, the upper coil part 120T is not capable of being inserted more deeply, and is prevented from being rotated in the inserted state.

Next, FIG. 16B shows a case to which the conductive plates described with reference to FIGS. 16D to 16F are applied. Similar to the case of FIG. 16A, an upper coil part 1120T" is inserted into the bobbin 1110 through the first opening OP1, and a lower coil part 1120U" is inserted into the bobbin 1110 through the second opening OP2.

However, the conductive plates may be fixed to and electrically connected to each other through a soldering method, rather than using the bolt 1131, the washer 1132, and the nut 1133. In order to realize soldering, soldering pins 1134 may be inserted through first holes H1" and second holes H2" overlapping each other in the thickness direction. In some embodiments, terminals TM, which are electrically connected to the soldering pins 134 or through which the soldering pins 1134 are inserted, may be further provided. When the transformer 1100 is mounted onto a substrate, the terminals TM may serve as electrical paths with the secondary coil and may also serve to fix the transformer 1100 onto the substrate. In FIG. 16B, the terminals TM are disposed between the upper coil part 1120T" and the lower coil part 120U" in the thickness direction, but this is merely given by way of example. The terminals TM may be disposed on the upper coil part 1120T" or under the lower coil part 1120U" in the thickness direction depending on the arrangement relationship with the substrate (not shown). Even if the conductive plates described with reference to FIGS. 14D to 14F are applied, the remaining components such as the bobbin 1110 and the core 1140 may be applied in the same manner as described above.

Figure 17:
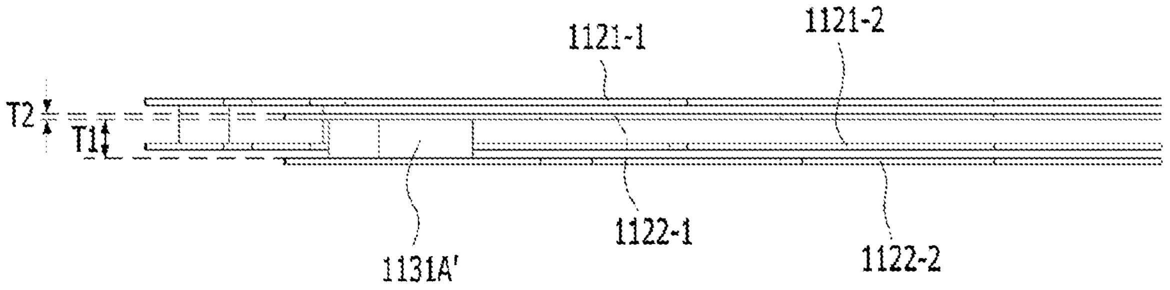
FIG. 17 shows an example of engagement of conductive plates according to still another embodiment of the present disclosure.

Meanwhile, according to still another embodiment of the present disclosure, the spacing distance between conductive plates may be adjusted depending on the thickness of a washer. This will be described with reference to FIG. 17. FIG. 17 shows an example of engagement of conductive plates according to still another embodiment of the present disclosure.

In the above-described embodiments, it has been described that the thickness of the washer and the thickness of the conductive plate are the same. In this case, since conductive plates constituting one group are in close contact with each other, a separate insulation member such as an insulation film is required in order to insulate the conductive plates from each other. However, as shown in FIG. 17, when the thickness T1 of the washer 1131A' is greater than the thickness T2 of each of the conductive plates 1121-1, 1121-2, 1122-1 and 1122-2, at least some of the conductive plates that are adjacent to each other (e.g. 1122-1 and 1121-2) are not in close contact with each other and are spaced apart from each other in the thickness direction, so an insulation member may be omitted between the corresponding conductive plates.

Although only a limited number of embodiments have been described above, various other embodiments are possible. The technical contents of the above-described embodiments may be combined into various forms as long as they are not incompatible with one another, and thus may be implemented in new embodiments.

For example, in still another embodiment, the first signal end portion, the ground end portion, and the second signal end portion are illustrated as extending in the same direction (e.g. the x-axis direction) to be exposed together from one surface (e.g. front surface) of the bobbin 1110, but this is merely given by way of example. At least some of the first signal end portion, the ground end portion, and the second signal end portion may extend in a direction different from the direction in which the remaining end portions extend, and may be exposed from the bobbin in a direction different from the direction in which the remaining end portions are exposed.

In addition, although the conductive plates have been described as being engaged with and electrically connected to each other via the engaging parts including the bolts, the washers and the nuts, the conductive plates may be engaged with and electrically connected to each other through a soldering method.

Further, the transformers 100 and 1100 according to the above-described embodiments may be used for an instrument transformer, an AC-calculating board, a DC-DC converter, a step-up transformer, a step-down transformer, etc.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

The invention claimed is:

1. A transformer, comprising:
- a bobbin;
- a core part disposed outside the bobbin to expose a portion of the bobbin; and
- a plurality of conductive plates inserted into the bobbin, the plurality of conductive plates constituting an upper coil part, a middle coil part, and a lower coil part,
- wherein the bobbin comprises:
  - a lower receiving part receiving the lower coil part;
  - a middle receiving part disposed on the lower receiving part to receive the middle coil part;
  - an upper receiving part disposed on the middle receiving part to receive the upper coil part;
  - an upper connection part connecting the upper receiving part and the middle receiving part; and
  - a lower connection part connecting the middle receiving part and the lower receiving part,
  - wherein the upper receiving part comprises a first protruding portion covering at least a portion of an upper surface of an uppermost conductive plate of the upper coil part, and
  - wherein the lower receiving part comprises a second protruding portion covering at least a portion of a lower surface of a lowermost conductive plate of the lower coil part,
  - wherein the upper receiving part comprises:
    - a bottom portion that is in contact with the upper connection part;

a middle portion forming a sidewall of the upper receiving part and extending upwards from at least a region of an edge of an upper surface of the bottom portion; and a top portion disposed along an upper surface of the middle portion, and wherein an upper surface of the top portion protrudes inwards such that an end of the upper surface is further inwards than a lower surface of the top portion that is in contact with the middle portion when viewed in plan, wherein an inner side surface of the top portion connects the end of the upper surface to the lower surface of the top surface, and the inner side surface is formed at an incline with respect to a plane corresponding to the upper surface of the top portion and a plane corresponding to the lower surface of the top portion.

2. The transformer according to claim 1, wherein the first protruding portion protrudes from the top portion.

3. The transformer according to claim 1, wherein outer side surfaces of the bottom portion, the middle portion and the top portion are aligned in a thickness direction.

4. The transformer according to claim 1, wherein the inner side surface of the top portion and an inner side surface of the middle portion form an obtuse angle therebetween.

5. The transformer according to claim 1, wherein an edge of at least a portion of the upper surface of the uppermost conductive plate of the upper coil part is in contact with the inner side surface of the top portion that is formed at the incline.

6. The transformer according to claim 1, wherein each of the plurality of conductive plates comprises:

a coil portion corresponding to a winding of a secondary coil; and a first connection portion and a second connection portion respectively extending from both ends of the coil portion in one direction, wherein the one direction has a predetermined inclination with respect to a long-axis direction of the core part when viewed in plan.

7. The transformer according to claim 6, wherein each of the plurality of conductive plates comprises:

a first boundary portion between an outer side of one end of the coil portion and the first connection portion;

a second boundary portion between an inner side of the one end and the first connection portion;

a third boundary portion between an inner side of another end of the coil portion and the second connection portion; and a fourth boundary portion between an outer side of the other end and the second connection portion.

8. The transformer according to claim 7, wherein a curvature of any one boundary portion among the first boundary portion to the fourth boundary portion is greater than curvatures of three remaining boundary portions.

9. The transformer according to claim 8, wherein the first connection portion is connected to a ground terminal, wherein the second connection portion is connected to a signal terminal, and wherein the any one boundary portion having a curvature greater than curvatures of the three remaining boundary portions is the fourth boundary portion.

10. The transformer according to claim 6, wherein the plurality of conductive plates comprises:

a plurality of first type of conductive plates; and a plurality of second type of conductive plates having a planar shape that is bilaterally symmetrical with a planar shape of the first type of conductive plates, and wherein the plurality of first type of conductive plates and the plurality of second type of conductive plates are alternately disposed.

11. The transformer according to claim 6, wherein the predetermined inclination is less than 87 degrees.

12. The transformer according to claim 1, wherein each of the plurality of conductive plates comprises:

a coil portion corresponding to a winding of a secondary coil, the coil portion having an open annular planar shape;

a first connection portion extending from one end of the coil portion in a first direction; and a second connection portion extending from another end of the coil portion in a second direction different from the first direction, and wherein the first direction and the second direction form a predetermined angle therebetween when viewed in plan.

13. The transformer according to claim 12, wherein the predetermined angle is between 3 degrees and 90 degrees.

14. The transformer according to claim 12, wherein the first direction corresponds to a direction in which the plurality of conductive plates is inserted into the bobbin.

* * * * *